US012573373B2

(12) United States Patent
Vaughan et al.

(10) Patent No.: US 12,573,373 B2
(45) Date of Patent: Mar. 10, 2026

(54) METHODS AND SYSTEMS FOR SYNTHESISING SPEECH FROM TEXT

(71) Applicant: Spotify AB, Stockholm (SE)

(72) Inventors: Felix Mathew William Chase Vaughan, London (GB); Harry Alexander Coultas Blum, London (GB); John Flynn, London (GB); Zeenat Qureshi, London (GB)

(73) Assignee: Spotify AB, Stockholm (SE)

( * ) Notice: Subject to any disclaimer, the term of this patent is extended or adjusted under 35 U.S.C. 154(b) by 442 days.

(21) Appl. No.: 18/052,861

(22) Filed: Nov. 4, 2022

(65) Prior Publication Data

US 2023/0178069 A1 Jun. 8, 2023

(30) Foreign Application Priority Data

Nov. 5, 2021 (GB) ..................................... 2115964

(51) Int. Cl.

| | |
|---|---|
| ***G10L 13/08*** | (2013.01) |
| ***G10L 13/02*** | (2013.01) |
| ***G10L 13/047*** | (2013.01) |
| ***G10L 13/07*** | (2013.01) |

(52) U.S. Cl.

CPC .............. *G10L 13/08* (2013.01); *G10L 13/02* (2013.01); *G10L 13/047* (2013.01); *G10L 13/07* (2013.01)

(58) Field of Classification Search

CPC ....... G10L 13/08; G10L 13/047; G10L 13/07; G10L 25/30; G10L 13/04; G10L 13/00; G10L 13/02

See application file for complete search history.

(56) References Cited

U.S. PATENT DOCUMENTS

| | | | | |
|---|---|---|---|---|
| 2019/0122651 A1 | | 4/2019 | Arik et al. | |
| 2022/0020362 A1* | | 1/2022 | Kang | G06N 3/044 |
| 2022/0028367 A1* | | 1/2022 | Shekhar | G10L 13/047 |
| 2022/0165249 A1* | | 5/2022 | Wu | G10L 13/02 |

FOREIGN PATENT DOCUMENTS

| | | |
|---|---|---|
| GB | 2 590 509 A | 6/2021 |

OTHER PUBLICATIONS

Extended European Search Report, dated Dec. 8, 2022, EP Application No. 22205473.6, 10 pages.

(Continued)

*Primary Examiner* — Samuel G Neway

(74) *Attorney, Agent, or Firm* — Morgan, Lewis & Bockius LLP

(57) ABSTRACT

A method for synthesising speech from text includes receiving text and encoding, by way of an encoder module, the received text. The method further includes determining, by way of an attention module, a context vector from the encoding of the received text, wherein determining the context vector comprises at least one of: applying a threshold function to an attention vector and accumulating the thresholded attention vector, or applying an activation function to the attention vector and accumulating the activated attention vector. The method further includes determining speech data from the context vector.

18 Claims, 11 Drawing Sheets

(56) References Cited

OTHER PUBLICATIONS

Anonymous, "Tacotron 2: Human-like Speech Synthesis From Text By AI", Jul. 10, 2019, Retrieved from the Internet: https://nix-united.com/blog/neural-network-speech-synthesis-using-the-tacotron-2-architecture-or-get-alignment-or-die-tryin/#id-conventional-text-to-speech-approaches [retrieved on Jun. 22, 2022], 15 pages.

Shen et al "Natural tts synthesis by conditioning wavenet on mel spectrogram predictions" In: 2018 IEEE International Conference on Acoustics, Speech and Signal Processing, 5 pages.

Chorowski et al."Attention-Based Models for Speech Recognition", Jun. 24, 2015 , XP055730386, Retrieved from the Internet: http://papers.nips.cc/paper/584 7-attention-based-models-for-speech-recognition.pdf, 9 pages.

Colin Raffel et al "Online and Linear-Time Attention by Enforcing Monotonic Alignments", Apr. 3, 2017, XP055473250, Retrieved from the Internet: https://arxiv.org/pdf/1704.00784.pdf, 19 pages.

Combined Search and Examination Report under Sections 17 and 18(3), Application No. GB2115964.5, dated Aug. 3, 2022, 10 pages.

Anonymous, "Tacotron 2: Human-like Speech Synthesis From Text by AI", https://nix-united.com/blog/neural-network-speech-synthesis-using-the-tacotron-2-architecture-or-get-alignment-or-die-tryin/#id-conventional-text-to-speech-approaches, 2019, 21 pages.

Shen, Jonathan, et al. "Natural tts synthesis by conditioning wavenet on mel spectrogram predictions." 2018 IEEE international conference on acoustics, speech and signal processing (ICASSP). IEEE, 2018, 5 pages.

Chorowski, Jan K., et al. "Attention-based models for speech recognition." Advances in neural information processing systems 28, 2015, 9 pages.

Raffel, Colin, et al. "Online and linear-time attention by enforcing monotonic alignments." International Conference on Machine Learning. PMLR, 2017, 19 pages.

A. van den Oord, S. Dieleman, H. Zen, K. Simonyan, O. Vinyals, A. Graves, N. Kalchbrenner, A. W. Senior, and K. Kavukcuoglu, "WaveNet: A generative model for raw audio," CoRR, vol. abs/1609.03499, 2016, 15 pages.

Prenger, R., Valle, R. and Catanzaro, B., 2018. WaveGlow: A Flow-based Generative Network for Speech Synthesis. arXiv preprint arXiv:1811.00002, 5 pages.

De Cheveigné A, Kawahara H. Yin, a fundamental frequency estimator for speech and music. The Journal of the Acoustical Society of America. Apr. 2002;111(4):1917-30, 14 pages.

N. Kalchbrenner, E. Elsen, K. Simonyan, S. Noury, N. Casagrande, E. Lockhart, F. Stimberg, A. van den Oord, S. Dieleman, and K. Kavukcuoglu, "Efficient neural audio synthesis," in Proc. ICML, Jul. 2018, pp. 2415-2424, 10 pages.

Rikters M, Fishel M. Confidence through attention. arXiv preprint arXiv:1710.03743. Oct. 10, 2017, 13 pages.

Gulati et al. "Conformer: Convolution-augmented transformer for speech recognition." arXiv preprint arXiv:2005.08100 (2020), 5 pages.

* cited by examiner

METHODS AND SYSTEMS FOR SYNTHESISING SPEECH FROM TEXT

PRIORITY APPLICATION

This application claims priority to UK Patent App. No. 2115964.5, filed Nov. 5, 2021, which is hereby incorporated by reference in its entirety.

FIELD

Embodiments described herein relate to methods and systems for synthesising speech from text.

BACKGROUND

Methods and systems for synthesising speech from text, also referred to as text-to-speech (TTS) synthesis, are used in many applications. Example include devices for navigation and personal digital assistants. TTS synthesis methods and systems can also be used to provide speech segments for games, movies, audio books, or other media comprising speech. For example, TTS synthesis methods and systems may be used to provide speech that sounds realistic and natural.

TTS systems often comprise algorithms that need to be trained using training samples.

There is a continuing need to improve TTS systems and methods for synthesising speech from text.

BRIEF DESCRIPTION OF FIGURES

Systems and methods in accordance with non-limiting examples will now be described with reference to the accompanying figures in which:

FIG. 10 (*b*) shows a plot of attention for a sample input text; and

DETAILED DESCRIPTION

Figure 1:
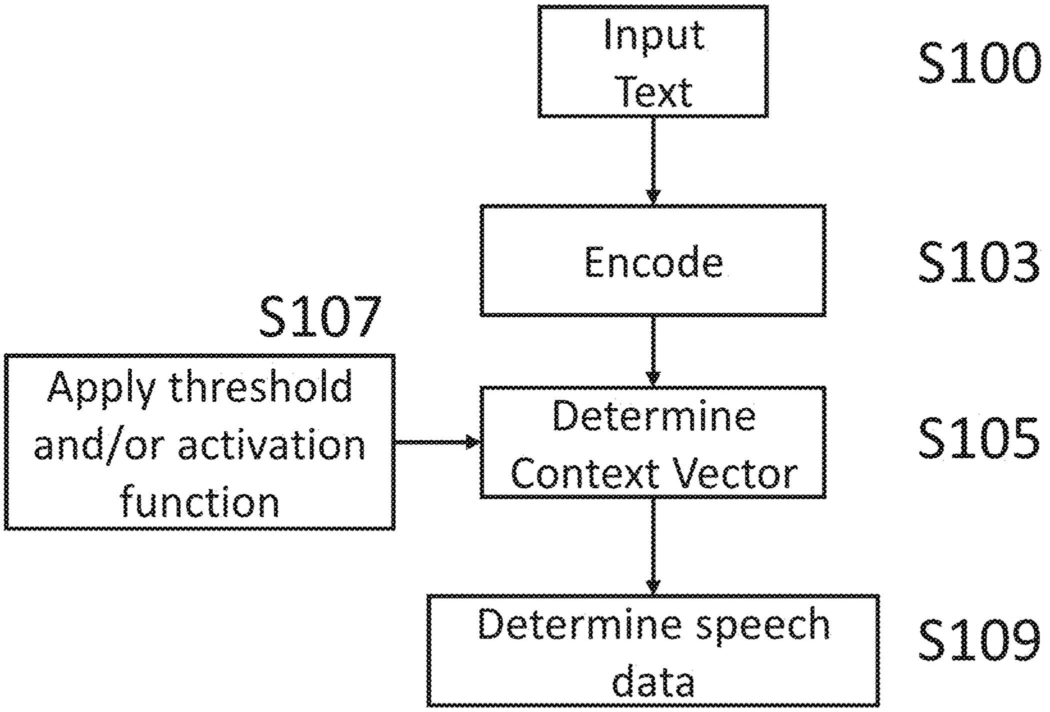
FIG. 1 shows a schematic illustration of a method for synthesis of speech from text.

According to a first aspect, there is provided a computer implemented method for synthesising speech from text. The method comprises:

Receiving text;

Encoding, by way of an encoder module, the received text;

Determining, by way of an attention module, a context vector from the encoding of the received text, wherein determining the context vector comprises at least one of:

Applying a threshold function to an attention vector and accumulating the thresholded attention vector, or Applying an activation function to the attention vector and accumulating the activated attention vector; and, Determining speech data from the context vector.

The above method enables the synthesis of speech from text. The above method may provide speech with improved realism and/or naturalness. By realistic and/or natural, it is meant that the synthesised speech resembles natural speech when evaluated by a human.

The attention module is a module that receives encodings of the received text from the encoder module and outputs a context vector. The encoding from the encoder module may be referred to as an encoder state. The context vector is used to derive speech data. For example, the context vector may be used by a decoder module to determine speech data. Speech data may be a representation of a synthesised speech. Speech data may be converted into an output speech. An attention module comprises an attention vector that aligns the encoder input with the decoder output.

From one context vector, one or more frames of speech are obtained. The speech data is obtained from multiple context vectors, i.e. multiple frames.

To obtain the context vector, by way of an attention module, an attention vector is determined and an accumulation of the attention vector is performed. The attention vector is a vector of attention weights used to align the received text to the speech data. Accumulation of the attention vector means that attention vectors from previous timesteps are summed to one another (accumulated). Noise in the attention vectors may be accumulated. To reduce the accumulation of noise and to reduce the amplification of noise and errors that may occur, a threshold function is applied to the attention vector before accumulation. By applying the threshold function, it is meant that each element in the attention vector is compared to a predetermined threshold value, and then set to a value based on the comparison. After the threshold function is applied, the thresholded attention vector is accumulated. This may be referred to as cumulative attention threshold. By removing noisy values and preventing amplification of errors, the synthesised speech may be more natural and realistic.

For example, applying the threshold function to the attention vector comprises comparing each element of the vector to a predefined threshold (e.g. 0.5), and setting the element to 0 when it has a value less than the predefined threshold, and/or setting the element to 1 when it has a value equal to or more than the predefined threshold.

Additionally or alternatively, to improve the timing an activation function is applied to the attention vector. By applying the activation function, it is meant that the activation function is applied to each element in the attention vector. After the activation function is applied, the activated attention vector is accumulated. This may be referred to as cumulative attention duration.

The activation function is a non-linear function.

In an example, the activation function is a function that converts a vector of numbers into a vector of probabilities, wherein the vector of probabilities normalise to a sum of 1.

In an embodiment, the activation function is the softmax function. The softmax function a function that converts a vector of numbers into a vector of probabilities, where the probabilities are proportional to the relative scale of each element in the vector. The softmax function normalises the probabilities such that they sum to 1. The probabilities in the vector sum to 1. The effect of the softmax function is to present a clear representation of how long each phoneme has been attended to. This enables the method to produce more natural and accurate timing. By producing more natural and accurate timing, the synthesised speech may be more natural and realistic.

For example, the softmax function (typically) sets all elements of the attention vector to zero, except the maximum value which becomes 1. A sum of such vectors effectively counts how many times each phoneme was the most attended phoneme. This roughly corresponds to the "duration" that each phoneme was the main focus of attention. Hence, the cumulative attention duration represents the duration that each phoneme was the main focus of attention.

The attention module is configured to perform location-based attention.

The attention vector may also be referred to as alignment.

In an embodiment, determining the context vector comprises determining a score from the at least one of the accumulated thresholded attention vector, or accumulated activated attention vector.

In an embodiment, wherein determining speech data from the context vector comprises decoding, by way of a decoder module, the context vector.

In an embodiment, the decoder module comprises a recurrent neural network (RNN).

In an embodiment, the encoder module comprises a conformer. The conformer comprises self-attention layers. The conformer is more robust to received text having variable lengths. The conformer provides improved encoding of received text having long lengths. The effect of the conformer is to cause the synthesised speech to be more natural and realistic.

The received text may be divided into a sequence of phonemes and the sequence of phonemes are inputted into the encoder.

In an embodiment, the received text comprises a representation of a non-speech sound. A non-speech sound (NSS) refers to sound that does not comprise human speech. For example a non-speech sound is a laugh, a scoff, or a breath. A NSS may be modelled using one or more phonemes. Conversely, a speech sound refers to a sound that corresponds to a unit of human speech. An example of a speech sound is a word. Phonemes may be used to represent the sounds of words in speech.

To represent a NSS, unique phonemes for each sound to be represented are used. The phonemes represent a range of different sounds. For example, a laugh may be composed of many different "phonemes".

A non-speech sound may be represented by a token in the received text signal. A token is a unit that represents a piece of the received text. In an example, a non-speech sound is represented by repeating tokens. The effect of using a plurality of tokens (i.e. the repetition of tokens) is to provide more accurate mapping to speech data. The purpose of the repetition of tokens is to enable the encoder module to process the NSS. This may result in the method synthesising more natural and realistic speech. Note that the determined speech data may comprise non-speech sounds as well as speech sounds.

According to another aspect, there is provided a system comprising:

An encoder module configured to encode a representation of text;

A decoder module configured to generate speech data; and

An attention module configured to link the encoder module to the decoder module, Wherein the encoder module comprises a self-attention layer, and Wherein the decoder module comprises a recurrent neural network (RNN).

The system may comprise a text input configured to receive a representation of text. The representation of text may refer to character level representation of text, phoneme level representation, word level representation, plain text, or representation using any other acoustic unit.

The encoder module maps takes as input an input sequence having a first dimension. For example, the first dimension is (k,d), where k is the number of phonemes and d is the dimension of the embedding of each phoneme. In an example, d=512. The input sequence corresponds to the representation of text. The encoder module outputs an encoder state having the first dimension (k,d). The attention module takes as input the encoder state, having the first dimension, and outputs a context vector that has a second dimension. For example the second dimension is (m,d). m may be less than k. For example, m=1 when a single context vector is produced for each step of synthesis. The decoder module takes the context vector as input. From one context vector, a frame (or frames) of speech having a third dimension (m, n_decoder) is obtained, where, for example, n_decoder is a number of frequency bins used to construct a linear spectrogram. In an example, n_decoder is 80. The speech data comprises one or more frames of speech.

The system provides more realistic and natural speech data. The system, by way of the encoder module, is able to capture long range information in the received text more effectively. For example, the encoder module is better at capturing the effect of a "?" at the end of a sentence.

The system provides sequence to sequence mapping.

According to another aspect, there is provided a computer implemented method for training a prediction network, the prediction network configured to synthesise speech from text. The method comprises:

Receiving training data, wherein the training data comprises reference text, reference speech, and reference timing;

inputting the reference text to the prediction network, wherein the prediction network comprises an encoder module, a decoder module, and an attention module configured to link the encoder and decoder modules;

deriving an attention loss from the reference timing and from a predicted attention that is obtained from the attention module; and, updating the weights of the prediction network based on the derived attention loss.

The method for training the prediction network enables the prediction network to learn new tokens with a small training dataset.

An attention may comprise an attention vector. A predicted attention is the attention obtained from the attention module when a reference text is inputted.

In an embodiment, the prediction network is pre-trained. The prediction network is then further trained according to the disclosed method. The disclosed method enables the learning of new tokens on small datasets with minimal impact on or degradation in the quality of the pretained model.

In an example, the encoder module comprises a conformer.

The reference text may comprise a sequence of tokens. The reference timing may comprise a start time and an end time for at least one token.

In an embodiment, deriving an attention loss comprises

Determining a target attention from the reference timing; and

Comparing the target attention with the predicted attention.

In an embodiment, deriving an attention loss comprises determining a mask, wherein the mask is derived from the target attention; and applying the mask to the comparison of the target attention with the predicted attention.

In an embodiment, the attention loss comprises an Li loss. For example, the Li loss comprises a sum of the absolute differences between the predicted attention and the target attention.

In an embodiment, the method comprises:

determining a training loss, wherein the training loss is derived from the reference speech and speech data that is predicted by the prediction network;

combining the determined training loss with the attention loss; and updating the weights of the prediction network based on the combination.

In the disclosed method, the derived attention loss is influenced by the tokens from the reference text that correspond to the reference timing. The attention loss has the effect of forcing the prediction network to attend to the tokens that have a corresponding reference timing whilst generating predicted speech data at the corresponding reference time. In other words, the attention module is forced to attend to a particular token, whilst it is required to produce a particular sound. By updating the weights of the prediction network based on the derived attention loss, the prediction network learns said reference text better. By learning better, it is meant that a training metric reaches a suitable value faster (or with fewer samples). The trained prediction network may generate speech data that sounds natural and realistic.

During training, the prediction network is forced to attend to tokens that have a corresponding reference timing, via the attention loss, whilst also considering the difference between speech data predicted by the prediction network and the reference speech, via the training loss. The prediction network is therefore able to learn the tokens better. The prediction network learns to generate speech data that sounds natural and realistic.

In an embodiment, combining the training loss with the attention loss comprises addition.

In an embodiment, the attention module is configured to:

Derive a context vector from an encoding of the reference text, encoded by way of the encoder layer, wherein deriving a context vector comprises at least one of:

Applying a threshold function to an attention vector and accumulating the thresholded attention vector, or Applying an activation function to the attention vector and accumulating the activated attention vector.

In an embodiment, the reference text comprises one or more tokens, and the reference timing comprises a start and an end time of at least one token.

In an embodiment, the at least one token corresponds to a non-speech sound, and the start time and end time relate to the non-speech sound.

Particularly for non-speech sounds, training data may be limited. Reference speech comprising non-speech sounds (e.g. laughter, scoffs, or breath) is obtained by recording audio from human actors. It may be difficult to obtain a large number of samples comprising non-speech sounds from a human actor. The disclosed method solves the problem of limited training data by enabling the prediction network to learn to generate speech data that sounds natural and realistic (including, but not limited to, non-speech sounds) using a small dataset.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium. According to a further aspect, there is provided a carrier medium comprising computer readable code configured to cause a computer to perform any of the above described methods.

FIG. 1 shows a schematic illustration of a method for synthesising speech from text. Text is received and speech data is determined from the received text. The synthesis of speech data from text may be performed by a prediction network. The prediction network may be part of a TTS system.

In step S101, the text from which speech is to be synthesised is received. The text may be text provided by a user to the text-to-speech (TTS) system. The input text can be provided via an input device such as a keyboard.

In step S103, the received text is encoded. The received text is encoded by way of an encoder module. The received text may be in the form of a words, sentences, paragraphs, or other forms. Prior to encoding, the received text is converted into a sequence of characters or phonemes by an embedding module (not shown). The encoder module is configured to convert the sequence of characters (or phonemes) into an encoded features. The encoding may be referred to as an encoded feature or as an encoder state.

In step S105, a context vector is determined. The context vector is determined from the encoder state, by way of an attention module. Although it is not shown, the determination of the context vector may also be based on a representation of previously determined speech data. The purpose of the attention module is to focus on different parts of the encoded feature output by the encoder module. The attention module comprises an attention vector. The attention vector is a vector of attention weights. The attention vector may also be referred to as the alignment. The attention module is configured to determine the context vector based on the attention vector and the encoder state. As explained below, an accumulated attention vector may be used instead of the attention vector. The context vector indicates which part or parts of the encoded state are focused on. The context vector is used to determine the speech data (S109). From one context vector, one or more frames of speech is obtained. The speech data is obtained from multiple context vectors, i.e. multiple frames of speech.

In step S107, a threshold function, an activation function, or both functions are applied to an attention vector. Applying a threshold function means that each element of the attention vector (i.e., each attention weight) is compared to a threshold value. Based on the result of the comparison, the attention weight is adjusted. For example, each element of the vector is compared to a predefined threshold (e.g. 0.5), and set to 0 when it has a value less than the predefined threshold, and/or set to 1 when it has a value equal to or more than the predefined threshold. The threshold may be determined in advance.

Applying an activation function means that an activation function is applied to each attention weight. The activation function is non-linear function. For example, the activation function is the softmax function. The softmax function is as described herein.

After applying the threshold function and/or activation function, the attention vector is accumulated. Accumulation of the attention vector means that attention vectors from previous encoder timesteps are summed to one another (accumulated). From the accumulated attention vector, the context vector is determined.

In step S109, speech data is determined from the determined context vector.

For example, the speech data is determined by way of a decoder module. A decoder module is described further below The determined speech data comprise speech data from which an audio waveform may be derived. Alternatively, the speech data is an audio signal comprising speech.

The steps of the disclosed method S100 to S109 are performed by a prediction network.

Figure 2:
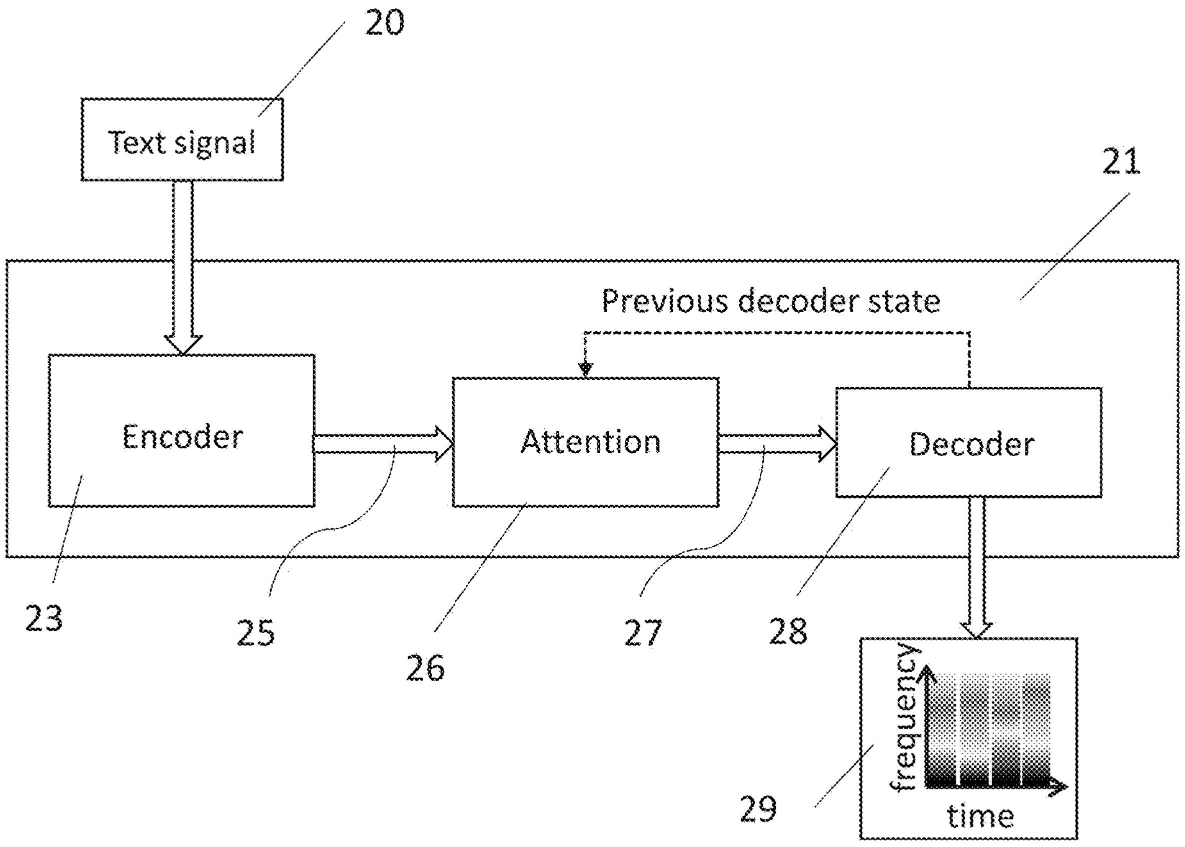
FIG. 2 shows a schematic illustration of a prediction network.

FIG. 2 shows a schematic illustration of a prediction network 21. The prediction network synthesises speech data 29 from a received text 20. Received text 20 may be referred to as a text signal. The prediction network 21 comprises a trainable neural network (NN).

The text signal 20 may be received in the form of a text file or any other suitable text form such as ASCII text string. The text may be in the form of single sentences or longer samples of text. A text front-end (not shown), converts the text into a sequence of units. The units may be a representation of text. The representation of text may refer to character level representation of text, phoneme level representation, word level representation, plain text, or representation using any other acoustic unit. Each unit may be referred to as a token. Thus, the text front-end may convert the received text to a series of tokens. For example, the word "hello" may be represented by ("heh", "lo"). The conversion of text to a series of tokens may be performed by the text front-end. The text front-end may comprise a language model, or a look-up table, or a rule-based method; the text front end may not comprise parameters that are learned when the prediction network 21 is trained.

The text front-end is described by way of an example next. The sentence "What [LAUGH], why?" is taken as an example. In this sentence, "[LAUGH]" is a non-speech sound (NSS) corresponding to laughter. NSS are described further below. In an example, the front-end contains a series rules that break the sentence down, first by word boundaries, i.e. space in this case, giving ["What", " ", "[LAUGH],", " ", "why?" ], an then by punctuation, ["What", " ", "[LAUGH]", " ", ",", " ", "why", " ", "?"]. In the case where phonemes are the input to the model, a look-up table or dictionary may be used to convert each item into its constituent phonemes. For example, using International Phonetic Alphabet (IPA) phonemes, each item may be converted into constituent phonemes as follows: "What"->"wɒt", "why"->"waɪ". Any items which are already part of a vocabulary of allowed inputs to the model (e.g. the punctuation, space and "[LAUGH]") will be ignored (i.e., they will not be converted into constituent phonemes). As described below, NSS are represented by phonemes. The NSS is represented by a token. The NSS is part of the vocabulary of allowed inputs. In the example this gives the final output ["w", "ɒ", "t", " ", "[LAUGH]", " ", ",", " ", "w", "a" "ɪ", " ", "?" ]. In the case where an item is not present in the look-up table and it is not already a valid token, the text front end may return an error and reject the text input. Alternatively, such an item may be directed to a model that is trained to predict phonemes or valid tokens given some text input.

The sequence of tokens is then directed to an embedding module (which is not shown). The embedding module is configured to convert each token from the sequence of tokens into an embedding vector. The embedding module may be a learned embedding module that is trained together with the prediction network 21. The embedding vector that represents each token is learnt during training. For example, for the word "hello", when represented by ("heh", "lo"), the embedding vector used to represent the phoneme "heh" is learnt during training.

In an example, the text front-end and the embedding module which are not shown, convert the text into a sequence of individual characters (e.g. "a" "b", "c" . . . ). In another example, the text front-end and the embedding module convert the text sample into a sequence of phonemes (/k/, /t/, /p/, . . . ). For example, each character or phoneme may be represented by a learned 512-dimensional embedding. The learned embedding may also be referred to as an embedding vector. The dimension of the embedding may be represented by d. d may be 512, for example. Phonemes are units of sound that distinguish a word from another in a particular language. For example, in English, the phonemes /p/, /b/, /d/, and /t/ occur in the words pit, bit, din, and tin respectively.

The speech data 29 comprises data encoded in a form from which a speech sound waveform can be obtained. For example, the speech data may be a frequency domain representation of the synthesised speech. In a further example, the intermediate speech data is a spectrogram. A spectrogram may encode a magnitude of a complex number as a function of frequency and time. In a further example, the speech data may be a mel spectrogram. A mel spectrogram is related to a speech sound waveform in the following manner: a short-time Fourier transform (STFT) is computed over a finite frame size, where the frame size may be 50 ms, and a suitable window function (e.g. a Hann window) may be used; and the magnitude of the STFT is converted to a mel scale by applying a non-linear transform to the frequency axis of the STFT, where the non-linear transform is, for example, a logarithmic function.

The prediction network 21 comprises an encoder 23, an attention network 26, and a decoder 28. The prediction network 21 maps a sequence of characters or phonemes to speech data 29. Although the examples below refer to a sequence of phonemes, it will be understood that a sequence of characters may alternatively be used. The prediction network may be a sequence to sequence model. A sequence to sequence model maps a fixed length input from one domain to a fixed length output in a different domain, where the length of the input and output may differ.

The encoder 23 of FIG. 2 may be a conformer encoder. The conformer is described further below in relation to FIG. 3. The encoder 23 takes as input the received text 20. The text 20 is converted to a sequence of characters or phonemes as described above. For example, the text 20 is converted to sequence of k phonemes, where k is a whole number. Each phoneme is represented by an embedding vector having a dimension d. Thus, the encoder 23 takes as input an input sequence having a dimension k×d (k,d). The encoder 23 returns an encoder state 25 which is further processed by the attention network 26. The encoder state 25 may also be referred to as the encoded feature vector 25. The encoder state 25 may be referred to as an encoding of the received text 20. The encoded feature vector 25 output by the encoder 23 may have a dimension corresponding to the number of phonemes, k, where each phoneme has a dimension of d. Thus, the encoded feature vector 25 has a dimension k×d (k,d).

The attention network 26 is configured to summarize the encoded feature vector 25 output by the encoder 23 and output a context vector 27. The context vector 27 is used by the decoder 28 for each decoding step. The attention network 26 may take information (such as weights) from previous decoding steps (that is, from previous speech frames decoded by decoder) in order to output the context vector 27. The function of the attention network 26 may be understood to be to act as a mask that focusses on the important features of the encoded features 25 output by the encoder 23. This allows the decoder 28, to focus on different parts of the encoded features 25 output by the encoder 28 on every step. The output of the attention network 26, the context vector 27, may have dimension m, where m may be less than k. Each of the m components has dimension d. Thus, the output of the attention network 26 has a dimension mxd. In an example, m=1 when a single context vector is produced for each step of the synthesis.

The attention network 26 takes as input the encoded feature vector 25 denoted as $H=\{h_1, h_2, \ldots, h_k\}$. Each element $h_1, h_1, \ldots h_k$ has a dimension d. A(j) is a vector of attention weights (called alignment) A(j) may also be referred to as an attention vector. A(j) refers to the alignment for each decoder step j. The decoder step j corresponds to a timestep t. The vector A(j) is a vector of k values $[\alpha_1, \alpha_2, \ldots, \alpha_k]$. The attention weights sum to 1. The vector A(j) is generated from a function attend(s(t−1), A(t−1), H), where s(t−1) is a previous decoding state and A(t−1) is a previous alignment. s(t−1) is 0 for the first iteration of first step. The attend( ) function is implemented by scoring each element in H separately and normalising the score. G(j) is computed from $G(j)=\Sigma_k A(j,k)\times h_k$. In other words, $G(j)=\alpha_{1j}\times h_1+\alpha_{2j}\times h_2+\alpha_{3j}\times h_3+\ldots$ G(j) is the context vector 27. How the attend( ) function is implemented is described further below in relation to FIG. 4.

The decoder 28 is an autoregressive RNN which decodes information one frame at a time. The information directed to the decoder 28 is the context vector 27 from the attention network 26. In another example, the information directed to the decoder 28 is the context vector 27 from the attention network 26 concatenated with a prediction of the decoder 28 from the previous step (s(t−1)). In each decoding step, that is, for each frame being decoded, the decoder may use the results from previous frames as an input to decode the current frame. In an example, the decoder is an autoregressive RNN that comprises two uni-directional LSTM layers with 1024 units. The prediction from the previous time step is first passed through a small pre-net containing two fully connected layers of 256 hidden ReLU units. The output of the pre-net, and the attention context vector are concatenated and then passed through the two uni-directional LSTM layers. The output of the LSTM layers is concatenated with the context vector 39 computed by the attention network for the current frame, and projected trough a linear transform to predict a mel spectrogram. The predicted mel spectrogram is further passed through a 5-layer convolutional post-net which predicts a residual to add to the prediction to improve the overall reconstruction. Each post-net layer is comprised of 512 filters with shape 5×1 with batch normalization, followed by tanh activations on all but the final layer. The output of the decoder 28 is the speech data 29.

The output if the decoder 28 is the speech data 29. The speech data comprises one or more frames of speech. From one context vector, m frames of speech may be obtained. The obtained frames of speech may have a dimension of m×n_decoder (m, n_decoder). n_decoder may be the number of frequency bins used to construct a spectrogram. In an example, n_decoder is 80. In an example, m=1.

Figure 3:
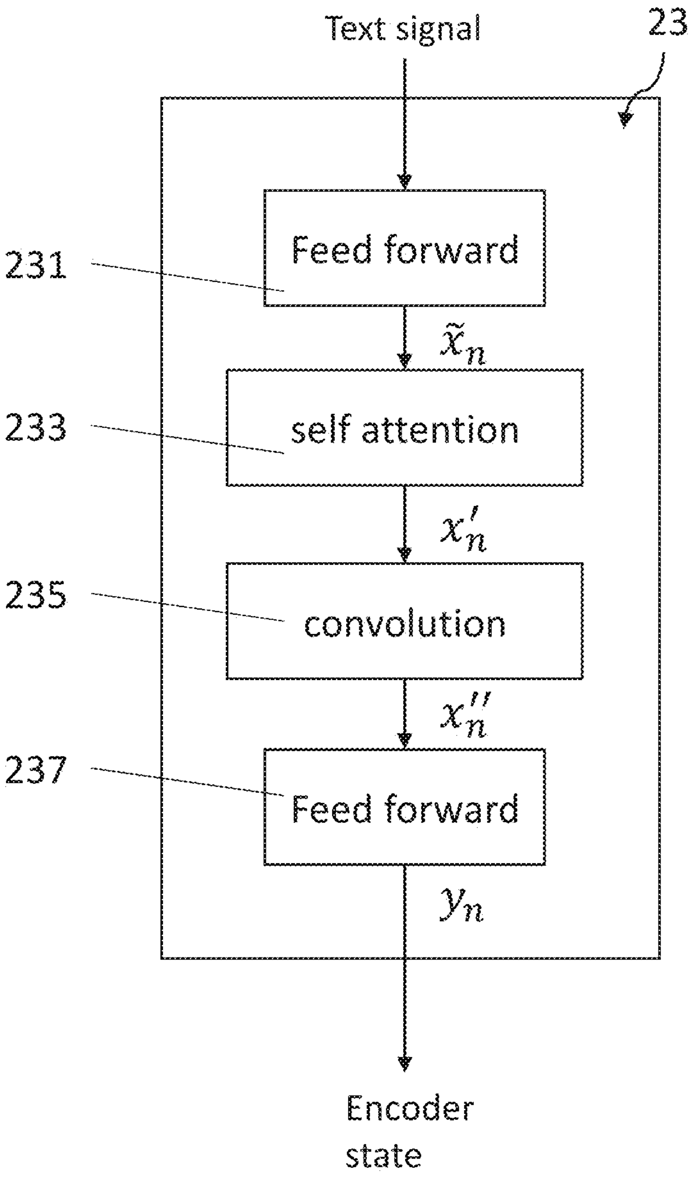
FIG. 3 shows a schematic illustration of an encoder.

FIG. 3 shows a schematic illustration of an encoder 23. The encoder 23 is a conformer encoder. The encoder 23 is used in the prediction network 21, as described in relation to FIG. 2. The encoder 23 takes as input a text signal. The text signal may comprise a sequence of characters or phonemes as described herein. The encoder 23 returns an encoder state.

The conformer encoder 23 comprises a first feed forward layer 231, a self-attention layer 233, a convolution layer 235, and a second feed forward layer 237. As shown in FIG. 3, the conformer 23 comprises said layers. Optionally, the conformer 23 comprises a stack of multiple blocks, where each block comprises said layers. Each block may be represented by the index n. There may be N blocks, where N is a whole number.

The first feed forward layer (FFL) 231 takes as input the text signal, for the first block n=1. For later blocks (n>1), the output from the previous block (n−1) is fed as input to the first FFL 231. The first feed forward layer 231 comprises two linear transformations and a nonlinear activation between them. A residual connection is added over the feed forward layers. Layer normalisation is applied to the input (text signal) within the residual unit before the first linear transformation. The nonlinear activation comprises a swish activation function (the swish function is defined as a×sigmoid(a)). The text signal is passed through the first FFL 231 with a half step residual connection.

The output of the first FFL 231 may be represented as:

$$\tilde{x}_n = x_n + \tfrac{1}{2}FFN(x_n),$$

where $x_n$ is the input into block n, and FFN( ) represents the first FFL. For the first block (n=1) or when there is only one block (N=1), $x_n$ corresponds to the text input. For later blocks (n>1), $x_n$ corresponds to the output from the previous block.

The output of the first feed forward layer 231 is directed to the self-attention layer 233. For example, the self-attention layer 233 may be a multi-headed self-attention (MSA) layer. The MSA layer 233 comprises layer normalisation followed by multi-head attention with relative positional embedding. Dropout may be used in training to regularise the model. The input to the MSA layer 233 is $\tilde{x}_n$. A residual connection is added over the layer normalisation and multi-head attention.

The multi-head attention with relative positional embedding is as follows. For ease of explanation, initially, the self-attention will be derived in relation to a single self-attention head. The derivation of self-attention for an input comprises the following steps:

(i) From the vector $\tilde{x}_n$ inputted to the MSA layer 233, a query, a key, and a value matrix are obtained. These matrices are obtained by multiplying the input with corresponding weight matrices that are trained.

(ii) Obtain a score by multiplying the query and key matrices (iii) Normalise the score (iv) Multiply the value matrix by the normalised score The relative positional embedding is performed together with the above steps and this is described further below.

The steps for deriving the self-attention may be represented mathematically as follows:

$$Z_{ij}^{rel}=E_{xi}^{T}W_{q}^{T}W_{k,E}E_{xj}+E_{xi}^{T}W_{q}^{T}W_{k,R}R_{i-j}+u^{T}W_{k,E}E_{xj}+v^{T}W_{k,R}R_{i-j},$$

Where, the first term $E_{xi}^{T}W_{q}^{T}W_{k,E}E_{xj}$ represents content based addressing, the second term $E_{xi}^{T}W_{q}^{T}W_{k,R}R_{i-j}$ represents a content dependent positional bias, the third term $u^{T}W_{k,E}E_{xj}$ governs global content bias, and the fourth term $v^{T}W_{k,R}R_{i-j}$ represents a global positional bias. $R_{i-j}$ is a relative positional embedding that is a sinusoid encoding matrix without learnable parameters. $u^T$ and $v^T$ are trainable parameters that corresponds to a query. $W_q$ is a trainable weight matrix that is used for obtaining a obtaining a query. $W_{k,E}$ and $W_{k,R}$ are trainable weight matrices that is used for obtaining a key. $E_{xi}$ is a matrix representing an embedding of the input.

When multiple attention heads are used, the above steps are performed separately for each head. Each attention head provides a separate output matrix $Z_{ij}^{rel}$. The separate output matrices are concatenated and multiplied with a further weight matrix trained jointly with the model. The resulting matrix is the output of the multi-headed self-attention.

Optionally, the number of attention heads used is 4 or 8. Although the above is described as multi-headed self-attention, it will be understood that, alternatively, a single attention head may be used.

The output of the MSA 233 may be represented as:

$$x'_n=\tilde{x}_n+\mathrm{MHSA}(\tilde{x}_n),$$

where $\tilde{x}_n$ is inputted into the MSA 233. $\tilde{x}_n$ is the output of the first FFL 231. MHSA(•) represents the output of the multi-headed self-attention.

The convolution layer 235 takes the output of the MSA 233 as input. The convolution layer 235 comprises gating, by way of a point-wise convolution and a gated linear unit (GLU), followed by a 1D depthwise convolution layer. Batchnorm is deployed after convolution during training. The convolution kernel size may be any of 3, 7, 17, 32, or 65. For example, the kernel size is 32. A residual connection is added over the gating and convolution layer.

The output of the convolution layer 235 may be represented as:

$$x''_n=x'_n+\mathrm{Conv}(x'_n),$$

where Conv(•) represents the convolution.

The second feedforward layer 237 takes the output of the convolution layer 235 as input. The second feedforward layer 237 is similar to the first feedforward layer 231, except that, in addition, layer normalisation is performed.

The output of the second feedforward layer 237 may be represented as:

$$y_n=\mathrm{Layernorm}(x''_n+\tfrac{1}{2}FFN(x''_n)),$$

where Layernorm(•) represents layer normalisation.

The output of a block n of the conformer encoder is the output of the second feedforward layer 237 of said block ($y_n$). The output of the encoder module 23 is the output of the last block (n=N). The output of the encoder module 23 is also referred to as the encoder state.

In an alternative, the conformer encoder corresponds to that according to Gulati et al. "Conformer: Convolution-augmented transformer for speech recognition." arXiv preprint arXiv:2005.08100 (2020).

In another alternative, instead of the conformer encoder shown in FIG. 3, the prediction network 21 of FIG. 2 comprises the following encoder. The alternative encoder takes as input the text signal 20. The encoder comprises a character embedding module which is configured to convert the text input, which may be in the form words, sentences, paragraphs, or other forms, into a sequence of characters. Alternatively, the encoder may convert the text input into a sequence of phonemes. Each character from the sequence of characters may be represented by a learned 512-dimensional character embedding. Characters from the sequence of characters are passed through a number of convolutional layers. The number of convolutional layers may be equal to three for example. The convolutional layers model longer term context in the character input sequence. The convolutional layers each contain 512 filters and each filter has a 5×1 shape so that each filer spans 5 characters. To the outputs of each of the three convolutional layers, a batch normalization step and a ReLU activation function are applied. The output of the convolutional layers is passed to a recurrent neural network (RNN). The RNN may be a long-short term memory (LSTM) neural network (NN). Other types of RNN may also be used. According to one example, the RNN may be a single bi-directional LSTM containing 512 units (256 in each direction). The RNN is configured to generate encoded features 311. The encoded features 311 output by the RNN may be a vector with a dimension k. The encoder is configured to convert the sequence of characters (or alternatively phonemes) into encoded features 25 which is then further processed by the attention network 26 and the decoder 28.

Figure 4:
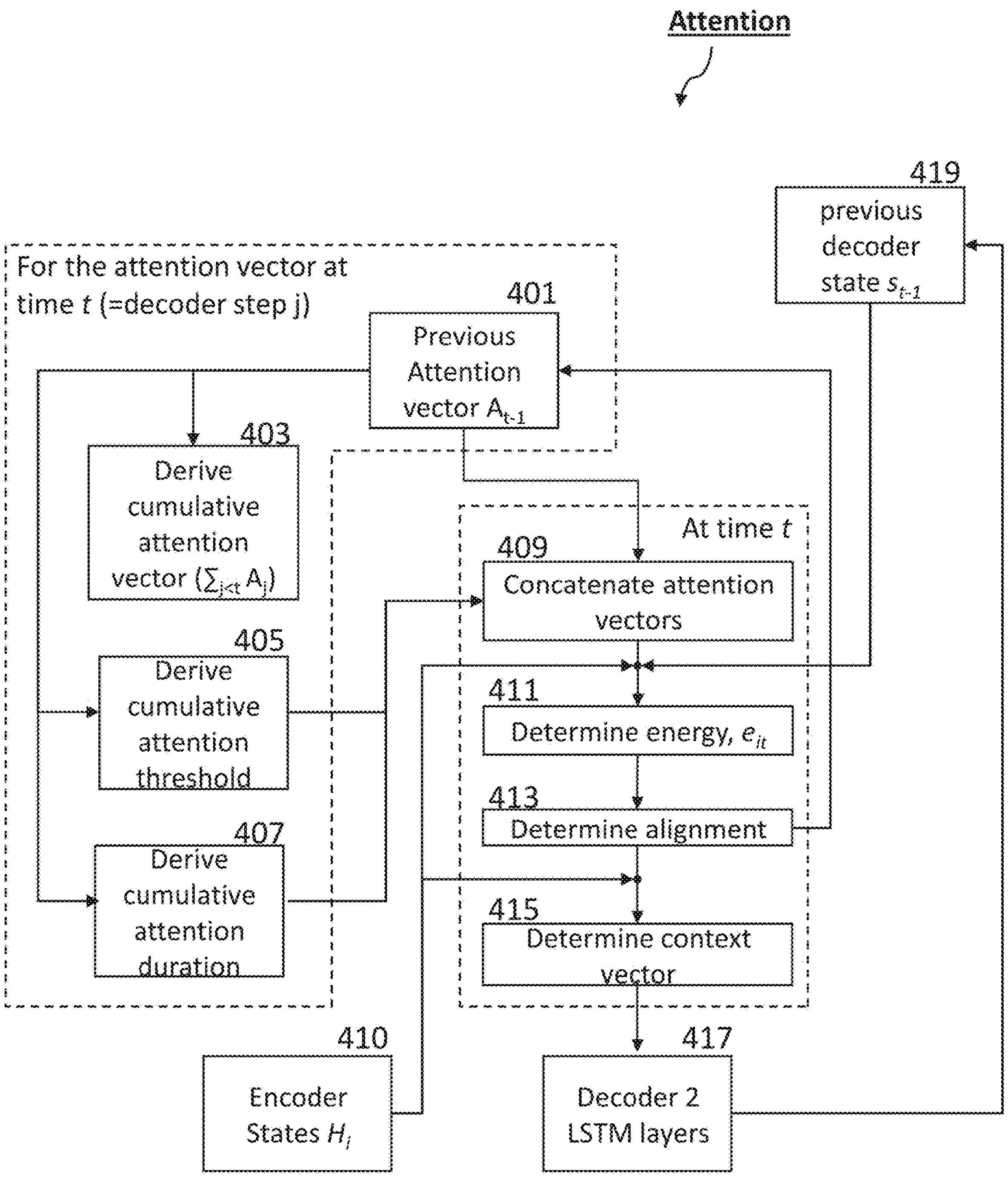
FIG. 4 shows a schematic illustration of the steps performed by an attention module.

FIG. 4 shows a schematic illustration of the steps performed by the attention module. FIG. 4 illustrates how a context vector is determined from the attention module 26 and how the context vector is used by the decoder module. The context vector is determined for a current time t. The attention module of FIG. 4 is a type of location-based attention. The attention module of FIG. 4 may implement the attend( ) described in relation to FIG. 2.

The attention network 26 is configured to summarize the encoded feature vector 25 output by the encoder 23 and output a context vector 27. The context vector 27 is used by the decoder 28 for each decoding step.

In 401 an attention vector $A_{t-1}$ from a previous time step is received. The attention vector is as described above. How the previous attention vector is obtained will be described below, in relation to 413.

In 403, a cumulative attention vector $\Sigma_{j<t} A_j$ is obtained. By cumulative attention vector, it is meant that attention vectors from previous time steps are added to one another.

Figure 5:
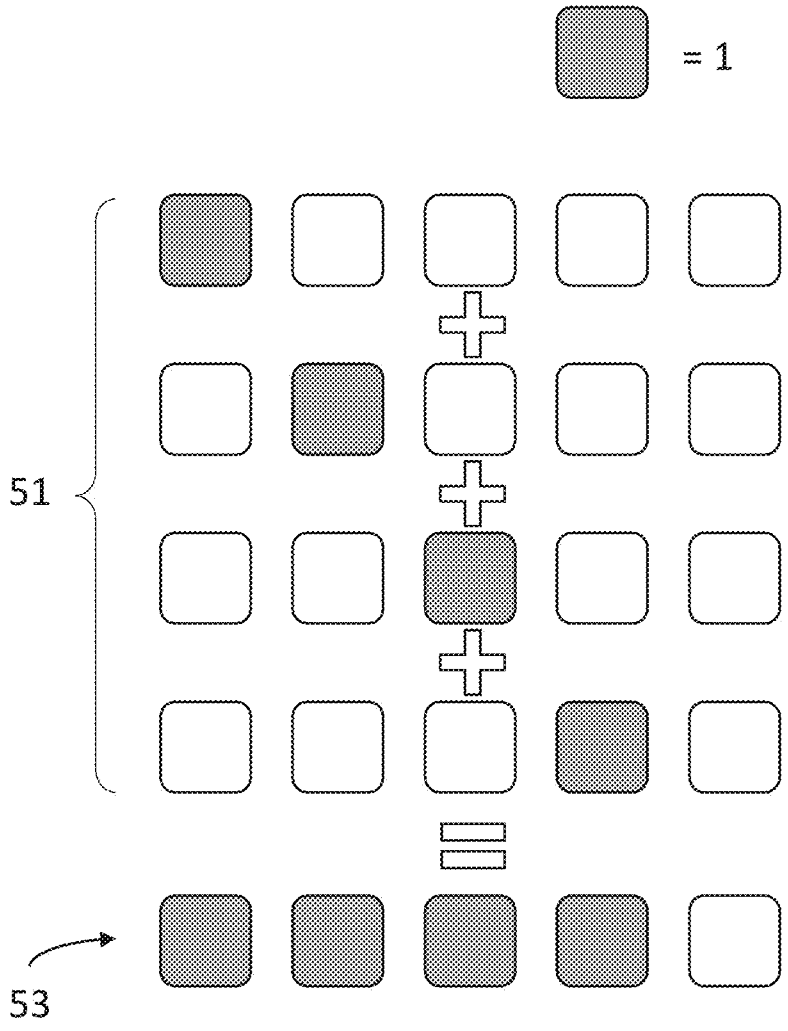
FIG. 5 shows a schematic illustration of the derivation of a cumulative attention vector.

FIG. 5 shows a schematic illustration of how a cumulative attention vector 53 is obtained. In the example of FIG. 5, there are 4 attention vectors 51. Each attention vector has a value of 1 (shaded) at one position, and a value of zero at the others (unshaded). The values of 1 occur at different positions in each vector. The cumulative attention vector 53 is obtained by adding together the four attention vectors 51. After adding, the cumulative attention vector comprises elements with a value of 1 at four positions, and a value of zero at the remaining position. The addition of previous attention vectors to obtain a cumulative attention vector may also be referred to as accumulating the attention vectors.

Returning to FIG. 4, at 405, a cumulative attention threshold is derived. The cumulative attention threshold is a type of cumulative attention where a further threshold function is applied. Applying the threshold function means that the elements of the attention vectors are considered in turn, and a threshold function is applied. Each element is compared to a predetermined threshold value, and then set to a value based on the comparison.

In a non-limiting example, each element is compared to 0.5, and then set to 0 when it has a value less than 0.5, or set to 1 when it has a value equal to or more than 0.5. The threshold function may be represented by thresh( ) and thresh( ) is a function that performs elementwise thresholding, and, in an example, thresh(x)=0 if $x<0.5$ or thresh(x)=1 if $x\geq 0.5$.

After the threshold function is applied, the thresholded attention vectors (that is, attention vectors where the elements have been compared to a threshold and set to a value based on the comparison) are added together to obtain a cumulative attention threshold.

When attention vectors are accumulated, small noisy values may accumulate, and amplify the noise and errors that might occur during attention. Thresholding reduces the noisy values and prevents the amplification of errors. Referring to the example above, element values below a threshold are set to zero. The effect of cumulative attention threshold is to cause the prediction network to generate speech with improved naturalness and accuracy.

At 407, a cumulative attention duration is derived. The cumulative attention duration is another type of cumulative attention where a further activation function is applied. Applying the activation function means that the elements of the attention vectors are considered in turn, and the activation function is applied to each element. An activation function is a non-linear function that converts each element to another value. After the activation function is applied, the activated attention vector (that is, an attention vector where the activation function has been applied to its elements) is accumulated. Optionally, the activation function is a function that converts a vector of numbers into a vector of probabilities. Further optionally, the activation function is a softmax function. The softmax function a function that converts a vector of numbers into a vector of probabilities, where the probabilities are proportional to the relative scale of each element in the vector. The softmax function is defined as $$\sigma(z)_i=\exp(z_i)/(\Sigma^{K}_{j=1}\exp(z_j)),\text{for } i=1, \ldots ,K, \text{ and } z=(z_1, \ldots ,z_K).$$

More concisely, the softmax function may be referred to as softmax( ).

The effect of using the cumulative attention duration is to present a clear representation of how long each phoneme has been attended to. This enables the method to produce more natural and accurate timing. By producing more natural and accurate timing, the synthesised speech may be more natural and realistic.

At 409, the attention vectors are concatenated. The concatenated attention vector is represented by $[A_{t-1}, \Sigma_{j<t}A_j, \Sigma_{j<t}\text{thresh}(A_j), \Sigma_{j<t}\text{softmax}(A_j)]$. The concatenated attention vector may be represented by $\alpha_j=[A_{t-1}, \Sigma_{j<t}A_j, \Sigma_{j<t}\text{thresh}(A_j), \Sigma_{j<t}\text{softmax}(A_j)]$. Here, the square brackets [ ] represent concatenation. Each term in the square brackets is a vector with the same length as the number of phonemes or tokens, so the result of concatenating is a matrix of 4 by the number of phonemes.

Although the example of FIG. 4 shows that both the cumulative attention threshold 405 and the cumulative attention duration 407 are used, it will be understood that only one of the two may be used. The concatenated attention vector may then be represented by $\alpha_j=[A_{t-1}, \Sigma_{j<t}A_j, \Sigma_{j<t}\text{thresh}(A_j)]$, or $\alpha_j=[A_{t-1}, \Sigma_{j<t}A_j, \Sigma_{j<t}\text{softmax}(A_j)]$. The result of concatenating is a matrix of 3 by the number of phonemes.

Alternatively, although the example of FIG. 4 shows that the cumulative attention threshold 405 and the cumulative attention duration 407 are used together with the cumulative attention vector $\Sigma_{j<t} A_j$, it will be understood that the cumulative attention vector $\Sigma_{j<t} A_j$ may be omitted. The concatenated attention vector may then be represented by $\alpha_j=[A_{t-1}, \Sigma_{j<t}\text{thresh}(A_j)]$, or $\alpha_j=[A_{t-1}, \Sigma_{j<t}\text{softmax}(A_j)]$. The result of concatenating is a matrix of 2 by the number of phonemes.

Yet alternatively, although the example of FIG. 4 shows that the cumulative attention threshold 405 and the cumulative attention duration 407 are used together with the cumulative attention vector $\Sigma_{j<t} A_j$ and the attention vector $A_{t-1}$, it will be understood that the concatenated attention vector $\alpha_j$ may comprise any one, or any two of: the cumulative attention threshold 405, the cumulative attention duration 407, the cumulative attention vector $\Sigma_{j<t} A_j$, or the attention vector $A_{t-1}$. The result of concatenating is a matrix of 1 by the number of phonemes, or a matrix of 2 by the number of phonemes.

In 411, an attention energy $e_{it}$ is determined. The attention energy is also referred to as an attention score. The attention score is obtained from the concatenated attention vectors $\alpha_j$, a previous decoder state $s_{t-1}$, and encoder state $H_i$. For example, the attention score is obtained from:

$$e_{it}=\text{score}(s_{t-1},\alpha_j,H_i)=v_a^T\tanh(W_{s_{t-1}}+VH_i+Uf_j+b),$$

where $v_a$, W, V and U are weight matrices to be learned. $f_j$ is a location feature computed by convolving the concatenated attention vector $\alpha_j$ with convolution filters F. F comprises weights to be learnt. Mathematically, $f_j=F*\alpha_j$, where the * represents a 1D convolution. b is a bias vector that is initialised to zeroes. b is also trainable and may be modified during training (although, generally, b will remain at values close to zero after training). The location feature $f_j$ may be referred to as a location layer, which takes as input the concatenated attention vector $\alpha_j$.

In 413, an alignment (for the current time step) is determined. The alignment is obtained by applying a softmax function to the determined energy $e_{it}$. The determined alignment is also referred to as the attention vector. The attention vector $A_t$ is an attention vector for the current timestep t. The current attention vector is kept for use in for subsequent steps. For example, it becomes the previous attention vector 401 for a subsequent step. It is also used for accumulating attention vectors.

In 415, a context vector is determined from the alignment for the current timestep t. The context vector is obtained as $G(t)=\Sigma_i A_{it} H_i$, where $A_{it}$ is the $i^{th}$ element of the attention at time t. And $H_i$ is the encoder feature vector of phoneme/token i.

In 417, the context vector G(t) is fed to the two LTSM layers of the decoder 28 to generate a decoder state $s_t$ for the current step. The generated decoder state $s_t$ is used as the previous decoder state for a subsequent timestep.

For example, the derivation of the decoder state is represented mathematically as follows. The output of the attention network 26 is generated as Y(t)=generate(s(t−1), G(t)), where generate( ) may be implemented using a recurrent layer of 256 gated recurrent units (GRU) units for example. The attention network 26 also computes a new state s(t)=recurrency(s(t−1), G(t), Y(t)), where recurrency( ) is implemented using LSTM.

Figure 6:
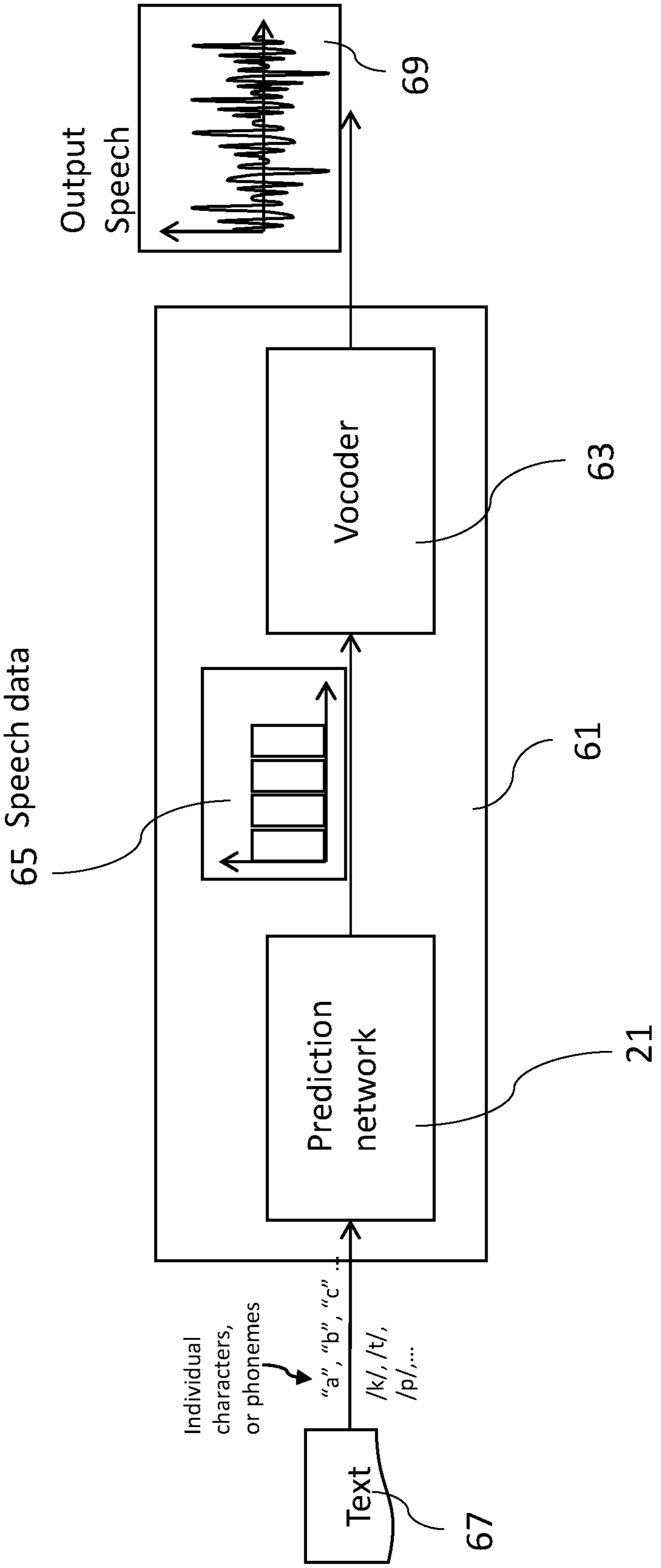
FIG. 6 shows a schematic illustration of a TTS system for generating speech from text.

FIG. 6 shows a schematic illustration of a TTS system 61 for generating speech 69 from text 67. The TTS system (also referred to as synthesizer) 61 can be trained to generate speech.

The system 61 comprises the prediction network 21 which is as described herein. The prediction network 21 is configured to convert text 67 into speech data 65. The system further comprises a Vocoder that converts the speech data 25 into an output speech 69. The prediction network 21 comprises a neural network (NN). The Vocoder also comprises a NN.

The speech data 65 comprises information from which an audio waveform may be derived. The speech data 65 may be highly compressed while retaining sufficient information to convey vocal expressiveness. The generation of the speech data 65 is described in relation to FIGS. 1 to 5.

The Vocoder module 63 takes the speech data 65 as input and is configured to convert the speech data 65 into a speech output 69. The speech output 9 is an audio file of synthesised speech and/or information that enables generation of speech. In an example, the speech data 65 is a mel spectrogram representing a prediction of the speech waveform.

The Vocoder module is described next. The Vocoder 63 comprises a convolutional neural network (CNN). The input to the Vocoder 63 is a frame of the mel spectrogram provided by the prediction network 21. The mel spectrogram 65 may be input directly into the Vocoder 63 where it is inputted into the CNN. The CNN of the Vocoder 63 is configured to provide a prediction of an output speech audio waveform 69. The predicted output speech audio waveform 69 is conditioned on previous samples of the mel spectrogram 65. The output speech audio waveform may have 16-bit resolution. The output speech audio waveform may have a sampling frequency of 24 kHz.

Alternatively, the Vocoder 63 comprises a convolutional neural network (CNN). The input to the Vocoder 63 is derived from a frame of the mel spectrogram provided by the prediction network 21. The mel spectrogram 65 is converted to an intermediate speech audio waveform by performing an inverse STFT. Each sample of the speech audio waveform is directed into the Vocoder 63 where it is inputted into the CNN. The CNN of the Vocoder 63 is configured to provide a prediction of an output speech audio waveform 69. The predicted output speech audio waveform 69 is conditioned on previous samples of the intermediate speech audio waveform. The output speech audio waveform may have 16-bit resolution. The output speech audio waveform may have a sampling frequency of 24 kHz.

Additionally or alternatively, the Vocoder 63 comprises a WaveNet NN architecture such as that described in Shen et al. “Natural tts synthesis by conditioning wavenet on mel spectrogram predictions.” 2018 IEEE International Conference on Acoustics, Speech and Signal Processing (ICASSP). IEEE, 2018.

Additionally or alternatively, the Vocoder 63 comprises a WaveGlow NN architecture such as that described in Prenger et al. “Waveglow: A flow-based generative network for speech synthesis.” ICASSP 2019-2019 IEEE International Conference on Acoustics, Speech and Signal Processing (ICASSP). IEEE, 2019.

Alternatively, the Vocoder 63 comprises any deep learning based speech model that converts an intermediate speech data 65 into output speech 69.

According to another alternative embodiment, the Vocoder 63 comprises a conversion module that converts intermediate speech data 65 into output speech 69. The conversion module may use an algorithm rather than relying on a trained neural network. In an example, the Griffin-Lim algorithm is used. The Griffin-Lim algorithm takes the entire (magnitude) spectrogram from the intermediate speech data 65, adds a randomly initialised phase to form a complex spectrogram, and iteratively estimates the missing phase information by: repeatedly converting the complex spectrogram to a time domain signal, converting the time domain signal back to frequency domain using STFT to obtain both magnitude and phase, and updating the complex spectrogram by using the original magnitude values and the most recent calculated phase values. The last updated complex spectrogram is converted to a time domain signal using inverse STFT to provide output speech 69.

Yet alternatively, the speech data 65 is in a form from which an output speech 69 can be directly obtained. In such a system, the Vocoder 63 is optional.

Figure 7:
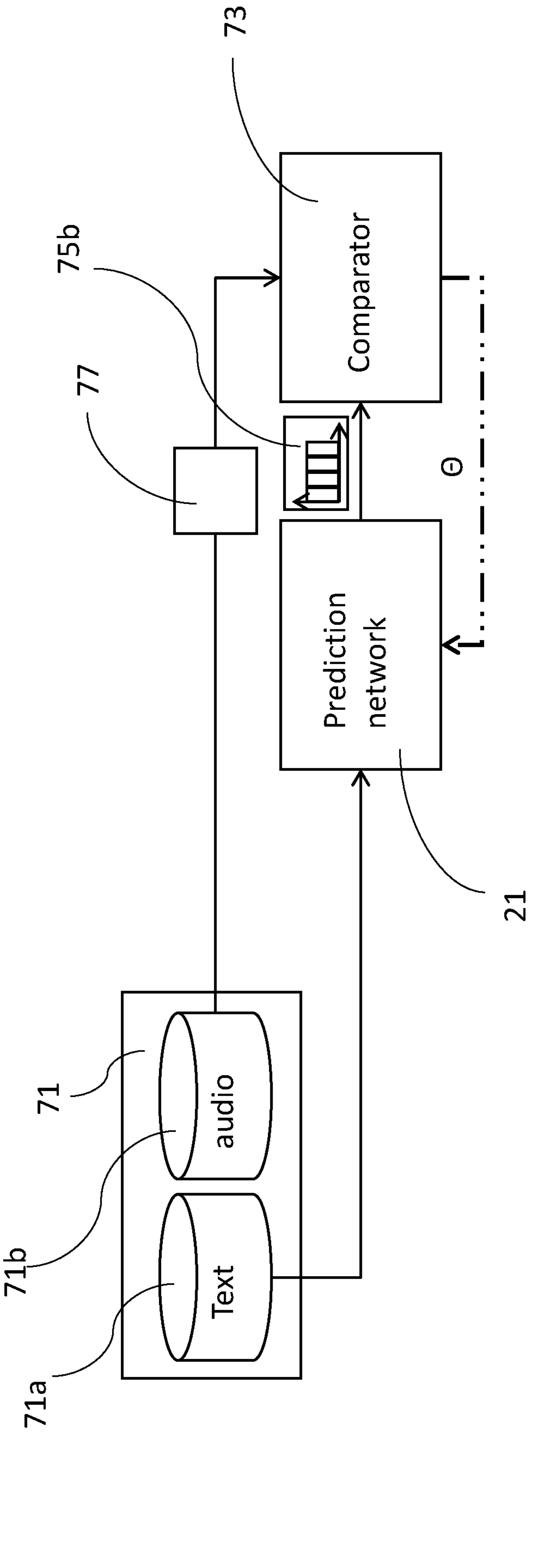
FIG. 7 shows a schematic illustration of a configuration for training a prediction network.

FIG. 7 shows a schematic illustration of a configuration for training the prediction network 21, according to an example. Referring to the synthesizer of FIG. 6, the prediction network 21 is trained independently of the Vocoder 63. According to an example, the prediction network 21 is trained first and the Vocoder 63 is then trained independently on the outputs generated by the prediction network 21.

According to an example, the prediction network 21 is trained from a first training dataset 71 of text data 71*a* and audio data 71*b* pairs as shown in FIG. 7. The Audio data 71*b* comprises one or more audio samples. In this example, the training dataset 71 comprises audio samples from a single speaker. In an alternative example, the training set 71 comprises audio samples from different speakers. When the audio samples are from different speakers, the prediction network 21 comprises a speaker ID input (e.g. an integer or learned embedding), where the speaker ID inputs correspond to the audio samples from the different speakers. In the figure, solid lines (-) represent data from a training sample, and dash-dot-dot-dash (-••-) lines represent the update of the weights Θ of the neural network of the prediction network 21. Training text 71*a* is fed in to the prediction network 21 and a prediction of the speech data 75*b* is obtained. The corresponding audio data 71*b* is converted using a converter 77 into a form where it can be compared with the prediction of the speech data 75*b* in the comparator 73. For example, when the speech data 75*b* is a mel spectrogram, the converter 77 performs a STFT and a non-linear transform that converts the audio data 71*b* into a mel spectrogram. The comparator 73 compares the predicted first speech data 75*b* and the converted audio data 71*b*. According to an example, the comparator 73 may compute a loss metric such as a cross entropy loss given by: -(actual converted audio data) log (predicted first speech data). Alternatively, the comparator 73 may compute a loss metric such as a mean squared error. The gradients of the error with respect to the weights Θ of the prediction network may be found using a back propagation through time algorithm. An optimiser function such as a gradient descent algorithm may then be used to learn revised weights Θ. Revised weights are then used to update (represented by -••- in FIG. 7) the NN model in the prediction network 21.

Audio data 71*b* of the training data 71 may be data provided by a human speaker. The human speaker may speak into a microphone to provide the audio data 71*b*. The human speaker may read out a sentence, corresponding to the text data 71*a*, to provide the audio data 71*b*.

In an example, the prediction network is trained for a number of training steps. A training step concerns the update of the network after processing a batch of data. A batch of data may correspond to whole sentences for example. For example, each whole sentence may have a duration of less than 10 seconds, with, with an average of 4 seconds. In an example, the number of training steps is 20k or more. In an example, a batch of data comprises one or more whole sentences.

Figure 8:
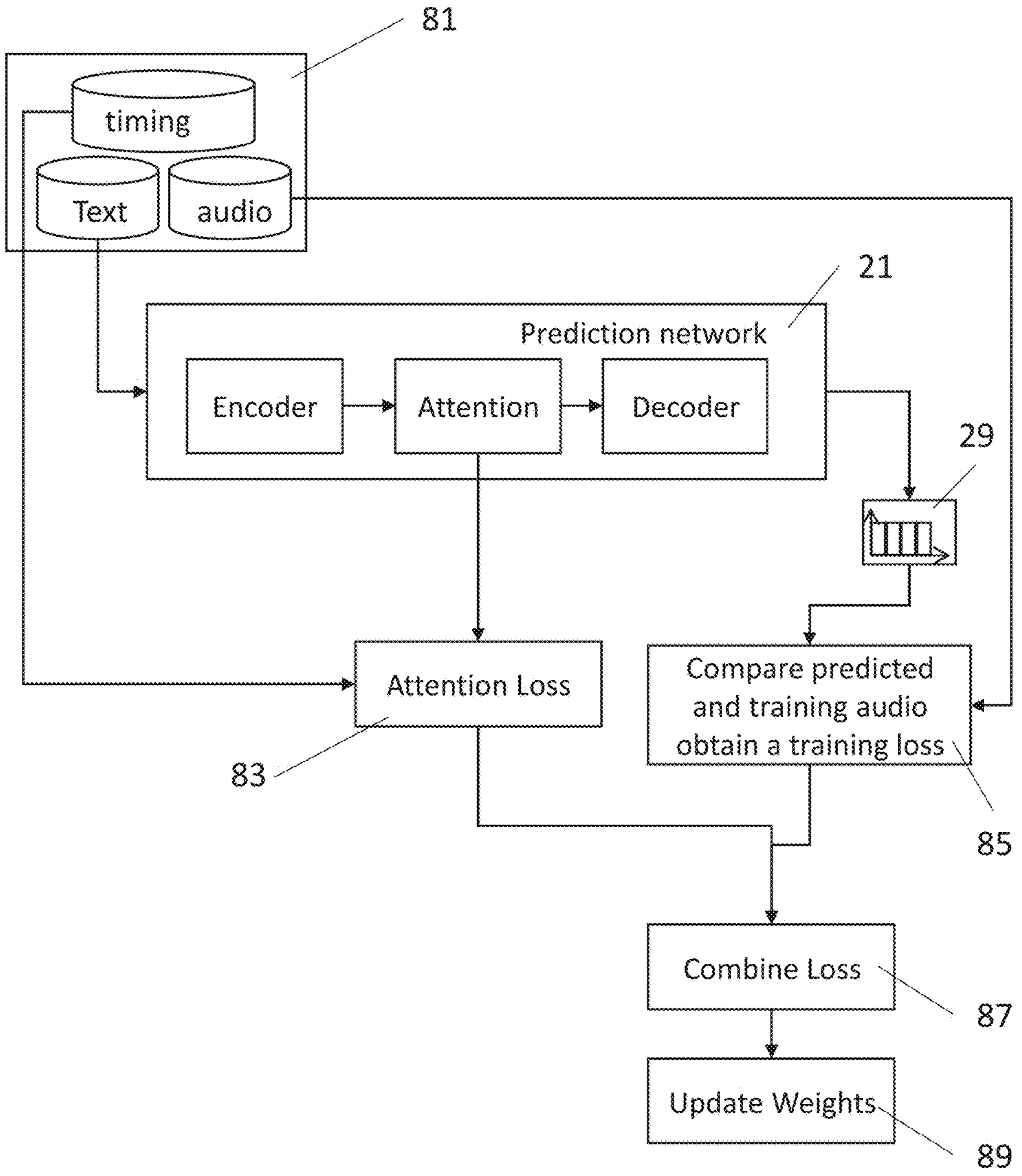
FIG. 8 shows a schematic illustration of a configuration for training a prediction network according to an embodiment.

FIG. 8 shows a schematic illustration of a configuration for training the prediction network 21 according to an embodiment. The training of the prediction network 21 comprises training with an attention loss 83. The attention loss is a loss derived from the attention module of the prediction network 21. How the attention loss is derived will be described further below. Training with an attention loss enables the prediction network to learn new tokens with little data.

Training using attention loss comprises using a second training dataset 81. The second training dataset 81 comprises reference text, reference audio, and reference timing. The reference text may be represented by a sequence of tokens. Each token may represent a phoneme, for example. The reference text may be represented by one or more phonemes as described herein. For at least one of the tokens, a reference timing is provided. For example, a start time and an end time is provided.

As shown in FIG. 8, together with the attention loss 83, a further training loss 85 is determined. The further loss metric 85 is determined by comparing a predicted speech data 29 with the reference audio. The predicted speech data 29 is the output of the prediction network 21 obtained by inputting the reference text into the prediction network 21. The further training loss may be one of the loss metrics described in relation to FIG. 7.

A combined loss 87 is obtained. The combined loss 87 may be obtained by addition of the training loss 85 to the attention loss 83. Alternatively, the combined loss 87 may be obtained using other operations such as weighted summation or averaging. Yet alternatively, a learnt weight average may be used. A learnt weight average is a weighted average where the weights are parameters of the model are learnt. The weights are free to be learnt under some regularisation constraint. Yet alternatively, a Dynamic weight averaging approach may be used. Yet alternatively, an uncertainty weighting method may be used.

The combined loss is then used to update 89 the weights of the prediction network 21. For example, an optimiser function such as a gradient descent algorithm may then be used to obtain revised weights. Revised weights are then used to update the prediction network 21.

The second training data 81 comprises reference timing in addition to reference text and reference audio. The reference text may be represented by a sequence of phonemes. Phonemes represent the sound of words in speech. The phonemes form the input to the prediction network. A phoneme may be represented by a token. At least one the tokens has a time label. For example, the time label is a start time (t1) and/or an end time (t2). The start time and end time are time positions in the audio that the phoneme corresponds to. The reference timing component of the training data comprises the time labels for the at least one token.

The purpose of the reference timing is to indicate which of the input tokens should be 'looked at' in particular. Said token is forced to be attended to by the attention module of the prediction network 21, while the prediction network is being trained. The token that is forced to be attended to is learnt better by the prediction network. By learning better, it is meant that a training metric reaches a suitable value faster, and with fewer samples. Training metrics for monitoring training using attention loss are described below.

As an illustration of the reference timing, suppose the reference text is "this is funny!". The text may be represented by a sequence of tokens {[token_1], . . . , [token_X], [token_Y], . . . [token_K]}. The tokens may correspond to phonemes. From the corresponding reference audio, it may be derived that token_X starts at time t1, and that token_Y starts at time t2. The reference timing may then comprise the entries t1 and t2, together with an index p, where t1 indicates when token_X starts, and t2 indicates when token_X ends (since token_X is adjacent to and precedes token_Y, and t2 is the start time of token_Y), and p indicates the index of the token. In this example, the effect of having a reference timing with t1 and t2 as entries is that during training, the attention module will be forced to attend to token_X, when the frames that correspond to times t1 and t2 are being predicted. An attention loss corresponding to token_X is then determined. The attention loss is used to update the weights of the model. The result is that the prediction network 21 trained with attention loss is able to learn token_X better and more quickly. The trained prediction network 21 may thus generate more natural and realistic sounds with limited training data.

In the above example, the reference text comprises words or speech sounds. In another example described below, the reference text comprises non-speech sounds (NSS).

How the reference timing is obtained for speech sounds is described next. Given the reference audio, a transcription of the audio, and the timings of tokens (representing phonemes or words) can be obtained automatically using a forced alignment model. A forced alignment model is a model configured to take a transcription and an audio file and generate a time-aligned version of the transcription. An example of a forced alignment model is the Montreal Forced Aligner. An alternative example is the Amazon Transcribe. Given the reference audio, reference text and the timings of tokens, an operator may then identify which of those tokens need to be attended to; the operator may mark those tokens by identifying their start and end times and their index. A reference timing may then be generated from the identified start and end times.

During training with attention loss, a training metric is determined to monitor model performance. Once the training metric satisfies a condition, the prediction network is deemed to have learnt well enough and training may be halted. An example of a training metric is a mean-opinion-score (MOS) based on listening tests. At predetermined intervals, the predicted speech data 29 is evaluated by way of a MOS. If required, the speech data 29 is converted to a speech audio waveform that can be listened to (as described in relation to FIG. 6, for example) A MOS is a numerical measure of a quality an approximation of a real world signal (e.g. synthesised speech) as judged by humans. For example, human judges might be asked to "Rate on a scale of 1 to 5 how natural and realistic you think this model is". The mean opinion score for each model is then obtained by taking the average of all the scores from the different human judges. In an example a MOS of greater than 3.5 indicates that the model is good enough. Alternative training metrics are described further below.

Next, the derivation of the attention loss is described.

Figure 9:
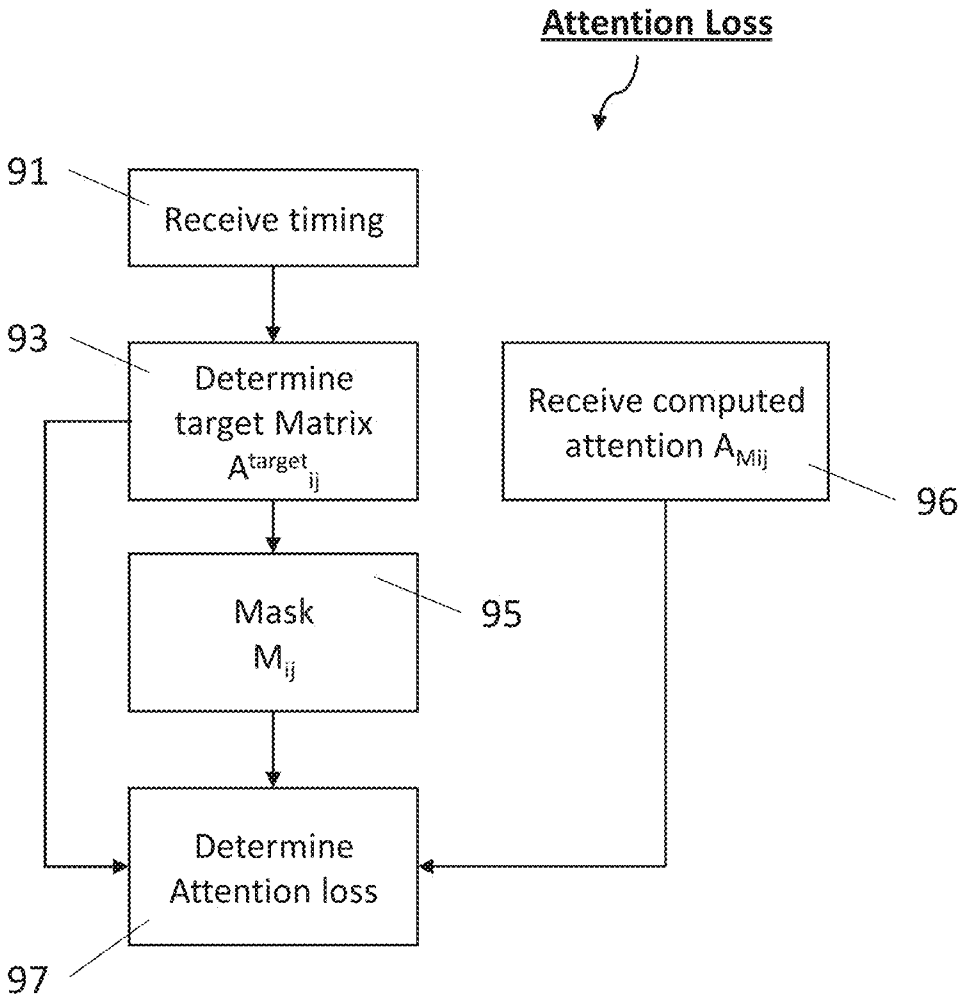
FIG. 9 shows a schematic illustration of the derivation of an attention loss.

FIG. 9 shows a schematic illustration of the derivation of an attention loss. The derived attention loss corresponds to the attention loss used in the configuration of FIG. 8.

In step 91, timing is received. The received timing corresponds to the reference timing of FIG. 8.

In step 93, a target attention matrix $A^{target}{}_{ij}$ is determined. Here, $A^{target}$ indicates the target attention matrix and the subscripts i,j indicate that the target attention matrix has a dimension (i, j). The target attention matrix is also referred to as a target attention. The target attention matrix is a type of attention matrix. An attention matrix is a matrix of dimension i×j where i indexes the phoneme and j indexes the decoder frames (e.g. mel frames). i may be referred to as the encoder index (or encoder step), while j is the decoder index (or decoder step). The attention matrix comprises the attention vector or alignment described herein.

The maximum value of j is the number of mel frames.

The target attention matrix $A^{target}_{ij}$ is determined as follows. The reference timing comprises time labels for at least one token. Suppose that the reference timing comprises a time t1 and t2. For a phoneme p that starts in the audio at time t1 and ends at time t2 the decoder indices j1 and j2 correspond to the start and end mel frame that this phoneme corresponds to. The indices j1 and j2 which may be obtained from:

$$j1=\text{round}(t1/h),\text{ and}$$

$$j2=\text{round}(t2/h),$$

where round( ) denotes rounding to the nearest whole number, and where h represents the hop length $h_p$ (the number of audio samples separating consecutive frames) divided by the sample rate S (the number of audio samples used to represent a second of audio). h is given by $h=h_p/S$. For example, the hop length is $h_p=256$ and sample rate S=22050.

The target attention matrix $A^{target}_{ij}$ is also of size i×j. All elements of the target matrix are set to zero except for those elements where i=p and j1≤j≤j2. When i=p and j1≤j≤j2, $A^{target}_{ij}=1$. In other words, elements corresponding to the phoneme with encoder index p, and that occurs in the audio over a time span that corresponds to decoder indices j1 and j2 are set to 1; all other elements are zero.

An example of a target attention matrix $A^{target}_{ij}$ is:

$$\begin{pmatrix} 0 & 0 & 0 & 0 \\ 0 & 0 & 0 & 0 \\ 0 & 1 & 1 & 0 \\ 0 & 0 & 0 & 0 \end{pmatrix}.$$

In 95, a mask $M_{ij}$ is obtained. The mask is also a matrix of size i×j. The elements of the mask are set such that $\Sigma_i M_{ij}=0$ for all j for which $\Sigma_i A^{target}_{ij}=0$, i.e. for all frames (all values of j) where there is no target, and $M_{ij}=1$ for all j for which $\Sigma_i A^{target}_{ij}=1$, i.e. the mask is entirely ones for all frames (all values of j) where there is a target.

An example of a mask $M_{ij}$, corresponding to the above example of the target attention matrix $A^{target}_{ij}$, is:

$$\begin{pmatrix} 0 & 1 & 1 & 0 \\ 0 & 1 & 1 & 0 \\ 0 & 1 & 1 & 0 \\ 0 & 1 & 1 & 0 \end{pmatrix}.$$

In 96, a computed attention matrix $Am_{ij}$ is obtained. The computed attention matrix $Am_{ij}$ is also a matrix of size i×j. The computed attention matrix $Am_{ij}$ comprises alignments computed by the attention module of the prediction network 21 for different values of j.

An example of a computed attention matrix $Am_{ij}$ is:

$$\begin{pmatrix} 0 & 0 & 0 & 0 \\ 0 & 0 & 0.1 & 1 \\ 0 & 0.3 & 0.9 & 0 \\ 1 & 0.7 & 0 & 0 \end{pmatrix}.$$

In step 97, the attention loss is determined. The attention loss is determined as follows:

A computed attention matrix $Am_{ij}$ is received;

A difference between the computed attention matrix $Am_{ij}$ and the target attention matrix $A^{target}_{ij}$ is obtained;

The mask $M_{ij}$ is multiplied (element wise) by the difference; The purpose of the mask is to focus only on the part of the difference matrix that corresponds to the phoneme(s) of interest. The phonemes of interest are those for which it is intended to guide the attention. The mask is configured to set to zero all other parts of the difference matrix, other than those that correspond to the phoneme(s) of interest.

The elements of the resulting matrix are summed to one another to obtain the attention loss.

Mathematically, this may be represented as: Attention loss$=\Sigma_{ij} M_{ij} * |Am_{ij} - A^{target}_{ij}|$, where * represents element wise multiplication, |•| represents taking an absolute value, and $\Sigma_{ij}$ represents the sum over all elements.

The attention loss is computed once the final full attention has been computed, i.e. after all the alignments A(j) at each decoder step t are obtained (for example, as described in relation to FIG. 4) and combined (concatenated) to obtain a full attention, which is a matrix of dimension i×j where i indexes the phoneme and j indexes the decoder frames (e.g. mel frames).

The Attention loss may be considered as an L1 loss. An L1 loss is a least absolute deviations loss function. The attention loss is added to a training loss and thus is used to update the weights of the prediction network. Using an L1 loss that relies on absolute differences, instead of a loss that relies on a squared differences, is more robust and less sensitive to outliers in the dataset.

Alternatively, an L2 attention loss may be considered. An L2 loss may rely on a squared difference.

Returning to FIG. 8, other features of the configuration for training the prediction network 21 will be described next.

In relation to FIG. 8, the training of the prediction network 21 with an attention loss 83 is described. Optionally, the training described in relation to FIG. 8 is performed on a prediction network 21 that has been trained in advance. Such a prediction network 21 may be referred to as a pretrained prediction network 21. For example the pretrained prediction network 21 is trained as described in relation to FIG. 7. The pretrained prediction 21 is trained to generate speech data from text. Further training the pretrained prediction network 21 according to the configuration described in relation to FIG. 8 enables the pretrained prediction network to learn new tokens with a limited training data (second training dataset 81).

When the pretrained prediction network 21 relates to a particular speaker, the further training described in FIG. 8 also relates to the same speaker. For example, the second training dataset 81 comprises reference audio corresponding the same speaker.

In relation to FIG. 8, although it is shown that a training loss 85 is combined with the attention loss 83, the combination of losses is optional. Instead, only an attention loss 83 is derived, and the weights are updated based on the attention loss only.

Alternative Training Metrics

Although the description in relation to FIGS. 8 and 9 refer to a MOS to assess the performance of the trained model, other metrics may be used either alone or in combination.

An example is a 'MUSHRA' test. MUSHRA stands for MUltiple Stimuli with Hidden Reference and Anchor. The MUSHRA is a listening test designed to compare two or more audio samples with respect to perceived fidelity. In the MUSHRA test, a human listener is provided with the reference sample (which might be a training sample performed by a human actor, and is labelled as such), test samples, a hidden version of the reference, and one or more anchors (anchors are low pass filtered versions of the reference). The human listener listens to the different samples and assigns a score to each (out of 0-100 scale). Generally, the human listener would assign a score of at least 90 to the hidden version of the reference. The score for the test samples would depend upon how their fidelity to with respect to the reference is perceived by the human listener. The MUSHRA test is generally performed using several human listeners and an average score for each sample is obtained. The average score from the MUSHRA test (also referred to as the MUSHRA score) is then the performance metric. In an example, a MUSHRA score greater than 60 indicates that the model performs well.

Another metric is referred to as the attention confidence. This comprises measuring the confidence of the attention mechanism over time. This is a measure of how focused the attention is at each step of synthesis. If, during a step of the synthesis, the attention is focused entirely on one input token (linguistic unit) then this is considered maximum "confidence" and signifies a good model. If the attention is focused on all the input tokens equally then this is considered minimum "confidence". Whether the attention is "focused" or not can be derived from the attention weights matrix. For a focused attention, a large weighting value is observed between one particular output token (mel frame) and one particular input token (linguistic unit), with small and negligible values between that same output token and the other input tokens. Conversely, for a scattered or unfocused attention, one particular output token would share multiple small weight values with many of the input tokens, in which not one of the weighting values especially dominates the others.

In an embodiment, the attention confidence metric is measured numerically by observing the alignment, $\alpha$, at decoder step t, which is a vector whose length is equal to the number of encoder outputs, k, (number of phonemes in the sentence) and whose sum is equal to 1. If $\alpha_{ti}$ represents the $i^{th}$ element of this vector, i.e. the alignment with respect to encoder output, then the confidence is calculated using a representation of the entropy according to $$-1/k\Sigma_i \alpha_{ti} \log(\alpha_{ti}) \quad \text{Equation (1)}$$

Here a value of 0.0 represents the maximum confidence and 1.0 minimum confidence. To obtain a value for the whole sentence, the sum is taken over all the decoder steps t and divided by the length of the sentence to get the average attention confidence score, or alternatively take the worst case, i.e. largest value. It is possible to use this metric to find periods during the sentence when the confidence is extremely low and use this to find possible errors in the output.

Another metric is a coverage deviation, which looks at how long each input token is attended to during synthesis. Here, an input token being 'attended to' by an output token during synthesis means the computation of an output token (acoustic units/mel spectrograms) is influenced by that input token. An output token attending to an input token will show itself as a weighting value close to one within the entry of the attention matrix corresponding to those two tokens. Coverage deviation simultaneously punishes the output token for attending too little, and for attending too much to the linguistic unit input tokens over the course of synthesis. If a particular input token is not attended to at all during synthesis, this may correspond to a missing phoneme or word; if it is attended to for a very long time, it may correspond to a slur or repeated syllable/sound.

In an embodiment, the coverage deviation is measured numerically by observing the attention matrix weightings, and summing over the decoder steps. This results in an attention vector, $\beta$, whose elements, $\beta_i$, represent the total attention for linguistic unit input token i during the synthesis. There are various methods for analysing this attention vector to look for errors and to produce metrics for judging model quality. For example, if the average total attention for all encoder steps, $\tilde{\beta}$ is known, deviations from this average can be found by using a coverage deviation penalty such as $$\text{Log}(1+(\tilde{\beta}-\beta_i)^2) \quad \text{Equation (2)}$$

Here, if $\beta_i=\tilde{\beta}$, then then the metric scores 0 and represents "perfect" coverage. If, however, $\beta_i$ is greater or smaller than $\tilde{\beta}$ then the metric score is a positive value that increases on a logarithmic scale with larger deviations from the average total alignment. If the particular phoneme that input token I represents is known, then different values of the perfect total attention for each encoder, i.e. $\tilde{\beta}$, can be used to get a more accurate measure. The perfect average coverage for a given phoneme may also depend on the speech rate of the actor, detailed analysis of a particular actor's speech rate can be used to improve the values of $\tilde{\beta}$ further to get more accurate measures. From the above, a score can be derived for each sentence using Equation (1) or Equation (2).

Further, to use the attention score as a performance metric for the trained model, the scores each test sentences are averaged across the plurality of test sentences and these are then compared with a threshold. For example: when the attention score is based on attention confidence (Equation 1), an average score below 0.1 indicates that the trained model performs well; when the attention score is based on coverage deviation (Equation 2), an average score below 1.0 indicates that the trained model performs well.

Non Speech Sounds

In the methods and systems described in relation to FIGS. 1 to 9, the received text has related to sentences or samples of text, which are represented by a sequence of individual characters or phonemes. The phonemes or characters relate to words in human speech. These are referred to as speech sounds.

However, additionally and optionally, the received text may relate to non-speech sounds (NSS). A non-speech sound (NSS) refers to a sound that does not comprise human speech. Example of non-speech sounds include, but are not limited to, a laugh, a scoff, a breath, a grunt, a yawn, a war-cry, or a cough.

To represent NSS, unique phonemes are used to represent each NSS. NSS are represented by tokens in the text and fed to the encoder via the text front end and embedding module described above. By unique phoneme, it is meant that e.g. the embedding corresponding to the phoneme representing a 'laugh' is different from the embedding phoneme representing a 'scoff'. The embedding also differs from other embeddings of the embedding module.

For NSS, these phonemes do not represent discrete singular sounds but a range of different sounds. For example, the embedding corresponding to a "laugh" may appear as if it is composed of one or more different "phonemes". In other words, non-speech sounds represent more complex sounds than the phonemes corresponding to speech sounds. Thus, the embeddings used to represent NSS may be more complex than those that represent phonemes of speech sounds.

NSS are represented as tokens in the received text. A token is a unit that represents a piece of the received text. For speech sounds, a token may represent a word, a character, or a phoneme for example. For a NSS, a token may represent the unique phoneme that corresponds to the NSS. Tokens for NSS have fixed time period.

Training of the prediction network for text comprising NSS is performed as described in relation to FIG. 8. When the reference text comprises NSS, the second training data 81 may be obtained as follows. Suppose the reference text is "this is [LAUGH] funny!". Here, "[LAUGH]" represents a token that represents a laugh. The tokens for this reference text may be determined to be {[token_1], . . . , [token_X], [token_Y], [token_Z] . . . , [token_K]}. Here [token_Y] is the token corresponding to the [LAUGH] sound in the reference audio and the tokens X and Z are the tokens of the end and start of the surrounding words respectively. If the end time of [token_X] is known to be t1 and the start time of [token_Z] is known to be t2 then it can also be inferred that t1 and t2 correspond to the start and end time of the laugh token [token_Y] respectively. In this way, the start and end time of non-speech sounds may be obtained using the end and start times of speech sounds. The end and start times of the speech sounds may be obtained as described above in relation to FIG. 8. For non-speech sounds that are part of the reference audio, the non-speech sounds will be left out of the transcription. The start and end times of the tokens corresponding to non-speech sounds may be inferred using the timings of the surrounding speech sound tokens, as illustrated in the above example. A reference timing comprising the timing of the NSS tokens may then be generated from the inferred start and end times.

An example of text comprising NSS is:

"Really? [LAUGH]".

Here, the notation "[LAUGH]" means token that corresponds to the NSS of laughter.

Since the Tokens for NSS have a fixed time duration, in order to represent NSS with longer durations, the tokens for NSS are repeated.

For example the text of the above example may become "Really?[LAUGH] [LAUGH] [LAUGH]." to represent a laughter of longer duration.

Optionally, tokens for NSS are deliberately chosen to have a short duration, such that the tokens must be repeated in the received text. For example, tokens may have a length of 0.2 to 0.3 seconds. The actual duration is determined by experimentation. The effect of the repetition of tokens is to provide a more accurate mapping of the NSS to the predicted speech data. The accuracy improvement is obtained because the repetition enables the encoder to process the NSS. For example, more encoder inputs (i) relate to the NSS tokens due to the repetition. At the input of the encoder the repeated tokens take the form of a series of identical embeddings. At the output of the encoder, these embeddings are in general no longer identical, and may be transformed by the encoder to represent the time variation in the non-speech sound. This may result in the method synthesising more natural and realistic speech. Note that the determined speech data may comprise non-speech sounds as well as speech sounds.

Additionally and optionally, when the encoder is a conformer type encoder as described herein, the above improvement is enhanced. This is because the conformer encoder is more effective at capturing long range information, and therefore, it is more effective at processing the repeated tokens.

Yet additionally and optionally, when the cumulative attention threshold and/or the cumulative attention duration are used in the prediction network as described herein, the naturalness and realism of the synthesised speech may be further improved.

For repetition of tokens, the total duration of each non-speech sound in the audio must be known. This can be labelled manually, or alternatively, if the position in the text where the non-speech sound occurs is labelled, the duration can be inferred from the timings of the words either side of the non-speech sound. The timings of words can be obtained automatically using a forced alignment model, or a pre-trained TTS system trained on text only, as described herein.

In the example of "What [LAUGH], why?", the end time of the word "What" and the start time of word "why" may be obtained to obtain an estimate of the total duration of the laugh using a forced alignment or model pre-trained on text. Using this duration, and the predetermined token duration, the number of repetitions of the token may be determined, and laugh token may be repeated as required (i.e., the [LAUGH] may be replaced by [LAUGH] [LAUGH] . . . [LAUGH]).

Figure 10:
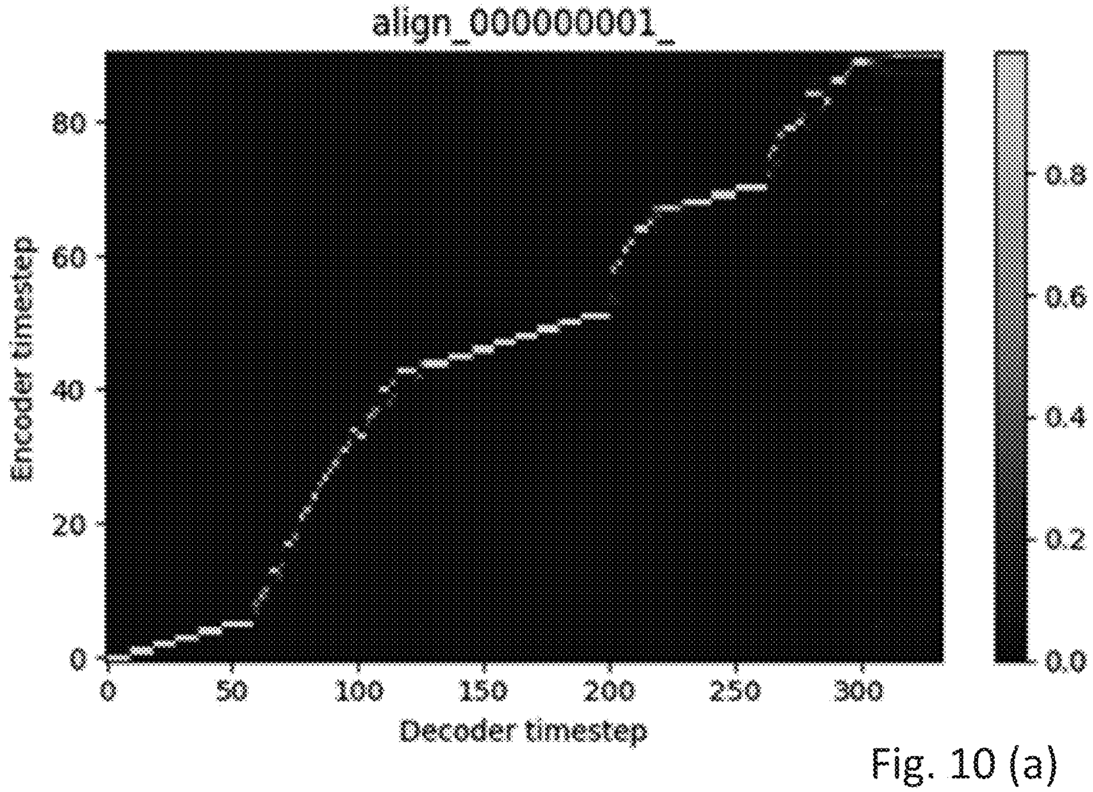
FIG. 10 (*a*) shows a plot of attention for a sample input text.
Figure 10:
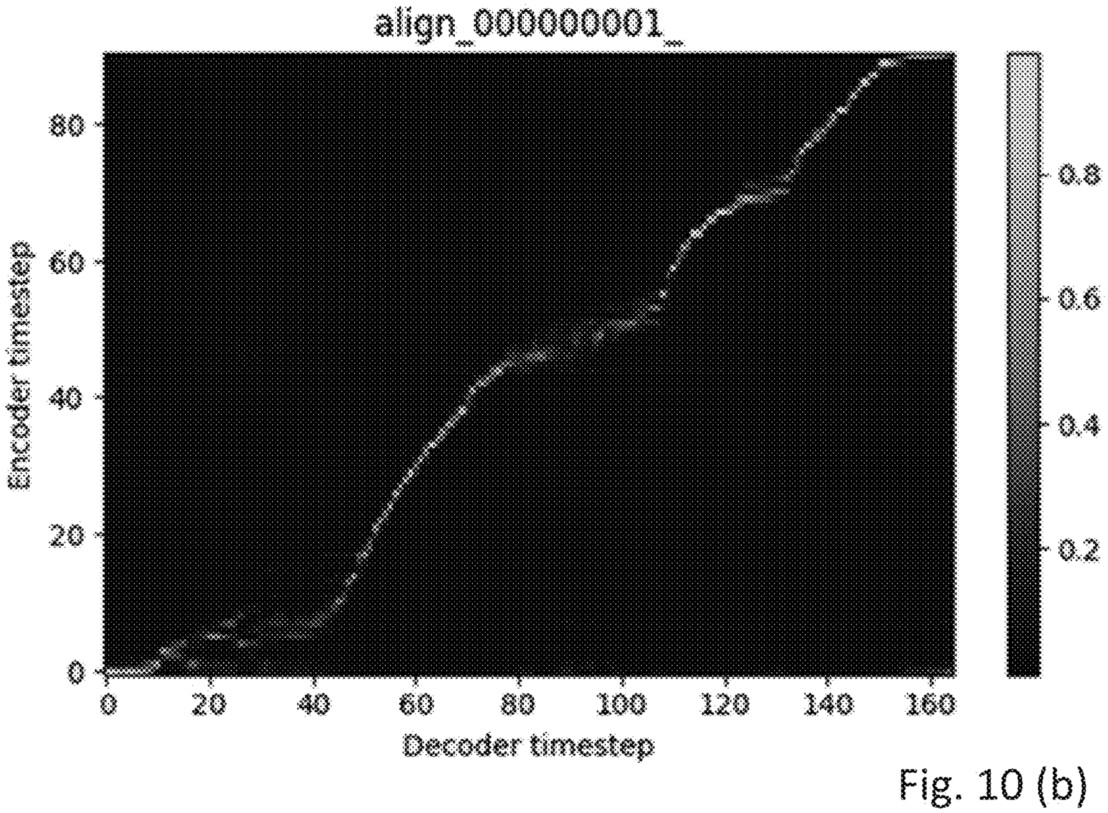

FIG. 10 (*a*) shows a plot of the attention for a sample input text according to an embodiment. FIG. 10 (*b*) shows a plot of the attention for the same sample input text according to an example.

In FIG. 10 (*a*) and FIG. 10 (*b*), the horizontal axis represents the decoder timestep (j) and the vertical axis represents the encoder timestep(i). The colour represents the value of the attention weights (lighter values tend to 1, while darker values tend to 0).

The sample input text is:

[SCOFF][SCOFF] [SCOFF] [SCOFF] [SCOFF] [SCOFF] Arnold will get the computers cleaned up [LAUGH] [LAUGH] [LAUGH] [LAUGH] [LAUGH] [LAUGH] [LAUGH] [LAUGH], and the radio [BREATH] [BREATH] [BREATH] and phone lines open.

For training the model to learn three NSS of [SCOFF], [LAUGH] and [BREATH], a dataset of around 358 lines are used. These lines correspond to recordings of one or more sentences of less than 10 second duration, with an average of 4 seconds. Each sentence contains one or more non-speech sounds with an average of 1. Each line is labelled with accurate timings for the non-speech phonemes. This forces the attention module to focus on the NSS phonemes. Performance of the model during training is evaluated using MOS as described herein.

FIG. 10 (*a*) shows the attention when above sentence is fed to the prediction network 21 of FIG. 2, the prediction network 21 having been trained using an attention loss as in FIG. 8.

FIG. 10 (*b*) shows the attention for the same input sentence, but the prediction network is not trained using an attention loss. Instead, the network is trained using the configuration of FIG. 7 and the network is not further trained.

As shown in FIG. 10 (*a*) the non-speech sounds are attended to more clearly in the attention loss case (each bright horizontal bar is attention to a non-speech token, the lowest left bars correspond to the scoff at the start of the sentence), with each repeated token attended to for a fixed amount of time, leading to greater controllability, reliability and quality. The sharp lines corresponding to the non-speech sound tokens indicate that a single encoder output (vertical axis) is attended to per decoder frame (horizontal axis). In contrast, as seen in FIG. 10 (*b*), the attention corresponding to the NSS tokens are unfocussed (they do not appear as sharp lines). Unfocussed attention means that each phoneme is being attended by multiple spectrogram frames. This may lead to synthesised speech that is less intelligible or less natural or realistic.

Moreover in FIG. 10 (*b*) it can be seen that the order of attention is not always monotonic. If the decoder/attention module does not attend to the repeated tokens in a fixed order the encoder is unable to learn a representation of the change in the non-speech sound over time. By forcing the target attention to be ordered and monotonic, this problem is overcome and more parameters of the model can be devoted to creating a realistic representation of the non-speech sound.

The FIGS. 10 (*a*) and 10 (*b*) also illustrate the effect of the show the cumulative attention duration feature. In FIG. 10 (*a*) the bright bars of similar length each correspond to attention to a non-speech token. The length of attention is similar in each one. The cumulative attention duration helps keep the attention length more consistent. This has the effect of keeping the timing of each non-speech token more constant and thereby helps controllability. This contributes to improved naturalness and realism of the prediction network.

Figure 11:
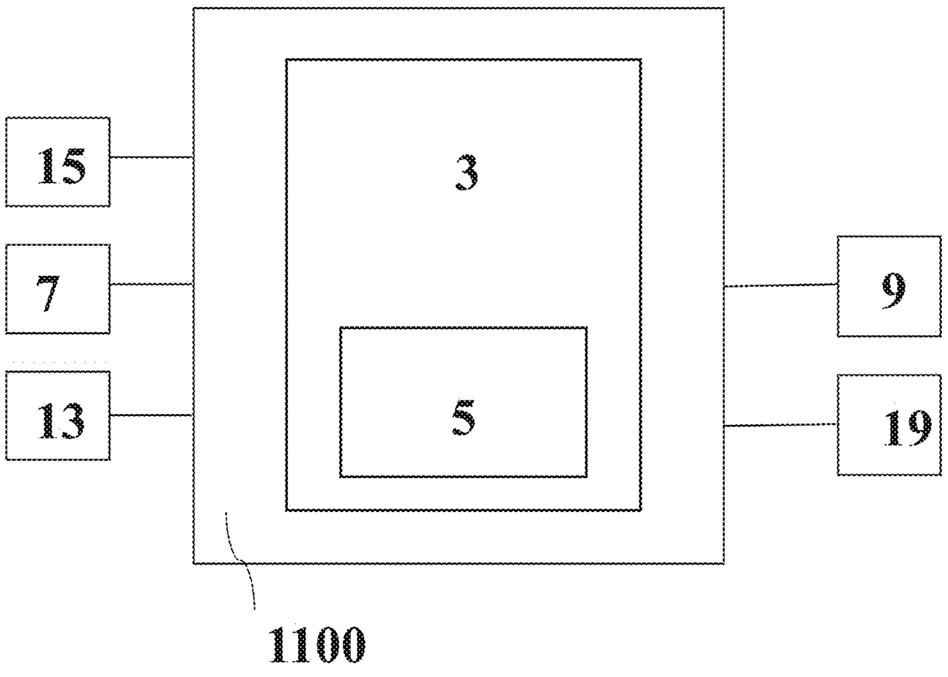
FIG. 11 shows a schematic illustration of a system for synthesizing speech from text according to an embodiment.

FIG. 11 shows a schematic illustration of a system for synthesizing speech from text according to an embodiment.

The TTS system 1100 comprises a processor 3 and a computer program 5 stored in a non-volatile memory. The TTS system 1100 takes as input a text input 7. The text input 7 may be a text file and/or information in the form of text. The text input may be a representation of text. A representation of text comprises: plain text, or a representation using units (such as words, characters, phonemes, graphemes).

The computer program 5 stored in the non-volatile memory can be accessed by the processor 3 so that the processor 3 executes the computer program 5. The processor 3 may comprise logic circuitry that responds to and processes the computer program instructions. The TTS system 1100 provides as output a speech output 9. The speech output 9 may be an audio file of the synthesised speech and/or information that enables generation of speech.

The text input 7 may be obtained from an external storage medium, a communication network or from hardware such as a keyboard or other user input device (not shown). The spoken speech input 13 may be obtained from an external storage medium, a communication network or from hardware such as a microphone or other user input device (not shown). The output 9 may be provided to an external storage medium, a communication network, or to hardware such as a loudspeaker (not shown) or a display.

In an example, the TTS system 1100 may be implemented on a cloud computing system, which transmits and receives data. Although a single processor 3 is shown in FIG. 11, the system may comprise two or more remotely located processors configured to perform different parts of the processing and transmit data between them.

Additionally and optionally, the text input 7 and/or the output 9, are provided on a user terminal. The user terminal may be a personal computer or portable device (e.g. mobile phone, tablet or laptop) that is separate from the TTS system 1100.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

What is claimed is:

1. A computer-implemented method for synthesising speech from text, the method comprising:

receiving text;

encoding, by way of an encoder, the received text to obtain an encoding of the received text;

determining, by way of an attention vector, a context vector from the encoding of the received text, wherein determining the context vector comprises:

applying a threshold function to the attention vector and accumulating a thresholded attention vector;

determining speech data from the context vector; and automatically converting the speech data into an output speech audio waveform.

2. The method according to claim 1, wherein determining the context vector comprises determining a score from the accumulated thresholded attention vector.

3. The method according to claim 1, wherein determining speech data from the context vector comprises decoding, by way of a decoder, the context vector.

4. The method according to claim 3, wherein the decoder comprises a recurrent neural network (RNN).

5. The method according to claim 1, wherein the encoder comprises a conformer.

6. The method according to claim 1, wherein the received text comprises a representation of a non-speech sound.

7. A method according to claim 6, wherein the non-speech sound is represented by one or more repeating tokens.

8. A non-transitory computer-readable storage medium comprising computer readable code configured to cause a computer to perform a set of operations, comprising:

receiving text;

encoding, by way of an encoder, the received text to obtain an encoding of the received text;

determining, by way of an attention vector, a context vector from the encoding of the received text, wherein determining the context vector comprises:

applying a threshold function to the attention vector and accumulating a thresholded attention vector;

determining speech data from the context vector; and automatically converting the speech data into an output speech audio waveform.

9. The non-transitory computer-readable storage medium according to claim 8, wherein determining the context vector comprises determining a score from the accumulated thresholded attention vector.

10. The non-transitory computer-readable storage medium according to claim 8, wherein determining speech data from the context vector comprises decoding, by way of a decoder, the context vector.

11. The non-transitory computer-readable storage medium according to claim 8, wherein the decoder comprises a recurrent neural network (RNN).

12. A computer system comprising one or more processors and memory storing instructions, configured to be executed by the one or more processors, to perform a set of operations, comprising:

receiving text;

encoding, by way of an encoder, the received text to obtain an encoding of the received text;

determining, by way of an attention vector, a context vector from the encoding of the received text, wherein determining the context vector comprises:

applying a threshold function to the attention vector and accumulating a thresholded attention vector;

determining speech data from the context vector; and automatically converting the speech data into an output speech audio waveform.

13. The computer system according to claim 12, wherein determining the context vector comprises determining a score from the accumulated thresholded attention vector.

14. The computer system according to claim 12, wherein determining speech data from the context vector comprises decoding, by way of a decoder, the context vector.

15. The computer system according to claim 14, wherein the decoder comprises a recurrent neural network (RNN).

16. The computer system according to claim 12, wherein the encoder comprises a conformer.

17. The computer system according to claim 12, wherein the received text comprises a representation of a non-speech sound.

18. The computer system according to claim 17, wherein the non-speech sound is represented by one or more repeating tokens.

* * * * *